US007630869B2

(12) United States Patent
Shen et al.

(10) Patent No.: US 7,630,869 B2
(45) Date of Patent: Dec. 8, 2009

(54) METHOD FOR PREDICTING VIBRATIONAL CHARACTERISTICS OF ROTATING STRUCTURES

(75) Inventors: I-Yeu Shen, Seattle, WA (US); Chaw-Wu Tseng, San Jose, CA (US); Jr-Yi Shen, Sunnyvale, CA (US)

(73) Assignee: University of Washington, Seattle, WA (US)

( * ) Notice: Subject to any disclaimer, the term of this patent is extended or adjusted under 35 U.S.C. 154(b) by 625 days.

(21) Appl. No.: 10/854,608

(22) Filed: May 26, 2004

(65) Prior Publication Data

US 2004/0243332 A1 Dec. 2, 2004

Related U.S. Application Data

(60) Provisional application No. 60/473,748, filed on May 27, 2003, provisional application No. 60/517,684, filed on Nov. 6, 2003.

(51) Int. Cl.
*G06G 7/48* (2006.01)
*G06F 7/60* (2006.01)
*G06F 17/10* (2006.01)
*G06F 17/50* (2006.01)

(52) U.S. Cl. .................................. 703/6; 703/2; 703/13

(58) Field of Classification Search ..................... 703/2, 703/6, 13
See application file for complete search history.

(56) References Cited

U.S. PATENT DOCUMENTS

| | | | | |
|---|---|---|---|---|
| 5,163,015 | A * | 11/1992 | Yokota | 703/7 |
| 6,101,453 | A * | 8/2000 | Suwa et al. | 702/56 |
| 6,453,729 | B1 * | 9/2002 | Muto et al. | 73/104 |
| 6,542,859 | B1 * | 4/2003 | Burns et al. | 703/7 |
| 6,658,358 | B2 | 12/2003 | Hao et al. | |
| 6,668,234 | B2 | 12/2003 | DiTommaso et al. | |
| 6,684,168 | B1 | 1/2004 | Kawamoto et al. | |
| 6,694,816 | B2 | 2/2004 | Matsuoka | |
| 6,704,639 | B2 | 3/2004 | Amano | |
| 6,708,142 | B1 | 3/2004 | Baillot et al. | |
| 6,834,393 | B2 * | 12/2004 | Akimaru et al. | 720/698 |

OTHER PUBLICATIONS

Fawzi M.A. El-Saeidy, "Finite Element Modeling of a Rotor Shaft Rolling Bearings System With Consideration of Bearing Nonlinearities", Journal of Vibration and Control, vol. 4, No. 5, 541-602 (1998).*

(Continued)

*Primary Examiner*—Kamini S Shah
*Assistant Examiner*—David Silver
(74) *Attorney, Agent, or Firm*—Christensen O'Connor Johnson Kindness PLLC

(57) ABSTRACT

A method is disclosed for analyzing the vibrational characteristics of rotating devices, such as hard disk drives and jet engines, that are coupled through bearings to flexible supports. In the method, the rotating device is discretized, for example, using a mesh suitable for finite element analysis. The support is also discretized. The natural frequency of elastic vibration modes for the rotating device is calculated and the natural frequency of vibration modes for the support is calculated. The mode shapes are then calculated and a set of modal basis corresponding to the mode shapes is utilized. Bearing stiffness and damping matrices are input, and the Lagrangian equations of motion are integrated numerically in the modal space, to calculate the vibrational response of the rotating device and support. The modal space results are then transformed into ordinary space. The vibrational analysis may be used to design devices having desired vibrational characteristics.

23 Claims, 7 Drawing Sheets

OTHER PUBLICATIONS

El-Saeidy, "Finite-Element Dynamic Analysis of a Rotating Shaft with or without Nonlinear Boundary Conditions Subject to a Moving Load", Nonlinear Dynamics 21: 377-408, 2000.*
Jintanawan, Thitima, "Vibration of Rotating Disk-Spindle Systems with Hydrodynamic Bearings", Univ. Washington, 2000.*
Shen, I. Y. (Steve) Shen, Resume, Rev Jan. 3, 2005, http://www.me.washington.edu/people/faculty/shen/cv.pdf.*
G. H. Jang, S. H. Lee, M. S. Jung, Free Vibration Analysis of a Spinning Flexible Disk-Spindle System Supported by Ball Bearing and Flexible Shaft Using the Finite Element Method and Substructure Synthesis, Journal of Sound and Vibration, vol. 251, Issue 1, Mar. 14, 2002, pp. 59-78.*
Bittner, H., and I.Y. Shen, "Taming Disk/Spindle Vibrations Through Aerodynamic Bearings and Acoustically Tuned-Mass Dampers," Institute of Electrical and Electronics Engineers, Inc., IEEE Transactions on Magnetics 35(2):827-832, 1999.
Deeyiengyang, S., and K. Ono, "Analysis of Ball-Bearing Vibrations of Hard Disk Spindles," Journal of Information Storage and Processing Systems 3:89-99, 2001.
Deeyiengyang, S., and K. Ono, "Suppression of Resonance Amplitude of Disk Vibrations by Squeeze Air Bearing Plate," Institute of Electrical and Electronics Engineers, Inc., IEEE Transactions on Magnetics 37(2):820-825, 2001.
Frees, G.M., "Disk Drive Spindle Dynamics—Analysis and Measurement," Advances in Information Storage Systems 6:237-262, 1995.
Heo, B., and I.Y. Shen, "A Parametric Study on Rocking Vibration of Hard Disk Drive Spindle Motors With Fluid-Dynamic Bearings and Rotating-Shaft Design," Microsystem Technologies 11(11):1204-1213, 2005.
Heo, B., et al., "Identifying Damping of a Gyroscopic System Through the Half-Power Method and Its Applications to Rotating Disk/Spindle Systems," American Society of Mechanical Engineers (ASME), Journal of Vibration and Acoustics 121:70-77, 1999.
Heo, B., et al., "Reducing Disk Flutter by Improving Aerodynamic Design of Base Castings," Institute of Electrical and Electronics Engineers, Inc., IEEE Transactions on Magnetics 36(5):2222-2224, 2000.
Heo, B., et al., "Taming Disk and Spindle Rocking by Damped Laminated Disks—An Experimental Study," Institute of Electrical and Electronics Engineers, Inc., IEEE Transactions on Magnetics 35(5):2304-2306, 1999.
Hsu, Y.-C., and I.Y. Shen, "Constrained Layer Damping Treatments for Microstructures," American Society of Mechanical Engineers (ASME), Journal of Vibration and Acoustics 124:612-616, 2002.
Hsu, Y.-C., et al., "Demonstration and Characterization of PZT Thin-Film Sensors and Actuators for Meso- and Micro-Structures," Sensors and Actuators A: Physical 116(3):369-377, 2004.
Huang, P.Y.H., et al., "A Comment on Boundary Conditions in the Modeling of Beams With Constrained Layer Damping Treatments," American Society of Mechanical Engineers (ASME), Journal of Vibration and Acoustics 123:280-284, 2001.
Huang, P.Y.H., et al., "Thickness Deformation of Constrained Layer Damping: An Experimental and Theoretical Evaluation," American Society of Mechanical Engineers (ASME), Journal of Vibration and Acoustics 123:213-221, 2001.
Huang, P.Y.H., et al., "Use of Microcellular Foam Materials in Constrained Layer Damping Treatments," Cellular Polymers 20(2):101-114, 2001.
Jeung, Y.S., and I.Y. Shen, "Development of Isoparametric, Degenerate Constrained Layer Element for Plate and Shell Structures," American Institute of Aeronautics and Astronautics, Inc., AIAA Journal 39(10):1997-2005, 2001.
Jia, H.S., "On the Bending Coupled Natural Frequencies of a Spinning, Multispan Timoshenko Shaft Carrying Elastic Disks," Journal of Sound and Vibration 221(4):623-649, 1999.
Jintanawan, T., and I.Y. Shen, "Free Vibration of a Rotating Disk Pack and Spindle Motor System With a Rotating-Shaft Design," Journal of Information Storage and Processing Systems 2:129-139, 2000.
Jintanawan, T., et al., "Free and Forced Vibrations of a Rotating Disk Pack and Spindle Motor System With Hydrodynamic Bearings," Journal of Information Storage and Processing Systems 1:45-58, 1999.
Jintanawan, T., et al., "Vibration Analysis of Fluid Dynamic Bearing Spindles With Rotating-Shaft Design," Institute of Electrical and Electronics Engineers, Inc., IEEE Transactions on Magnetics 37(2):799-804, 2001.
Ku, C.-P.R., and I.Y. Shen, "Effect of Disk Flexibility on Rocking Mode Frequencies of a Disk Drive Spindle Motor System," Society of Tribologists and Lubrication Engineers (STLE) and American Society of Mechanical Engineers (ASME) Tribology Conference, Kissimmee, Florida, Oct. 8-11, 1995.
Kuo, D., et al., "Mechanical-Performance of Laminated Discs," Institute of Electrical and Electronics Engineers, Inc., IEEE Transactions on Magnetics 36(1):166-170, 2000.
Lee, C.-W., and J.-S. Ham, "Mode Identification for Rotating Rigid Shaft With Flexible Disks by Mode Splits," Journal of Sound and Vibration 225(3):425-446, 1999.
Lee, C.-W., and S.-B. Chun, "Vibration Analysis of a Rotor With Multiple Flexible Disks Using Assumed Modes Method," American Society of Mechanical Engineers (ASME), Journal of Vibration and Acoustics 120:87-94, 1998.
Lim, S., "Finite Element Analysis of Flexural Vibrations in Hard Disk Drive Spindle Systems," Journal of Sound and Vibration 233(4):601-616, 2000.
Ou-Yang, J.-H., et al., "Experimental and Theoretical Studies of PZT Glide Head Vibration," Institute of Electrical and Electronics Engineers, Inc., IEEE Transactions on Magnetics 35(5):2493-2495, 1999.
Ou-Yang, J.-H., et al., "Forced Response of PZT Glide Heads," American Society of Mechanical Engineers (ASME), Journal of Tribology 122:780-786, 2000.
Park, J.S., and I.Y. Shen, "Aerodynamically and Structurally Coupled Vibration of Multiple Co-Rotating Disks," American Society of Mechanical Engineers (ASME), Journal of Vibration and Acoustics 126:220-228, 2004.
Park, J.S., et al., "A Parametric Study on Rocking Vibration of Rotating Disk/Spindle Systems With Hydrodynamic Bearings: Rotating-Shaft Design," Microsystem Technologies 8:427-434, 2002.
Park, J.S., et al., "Rocking Vibration of Rotating Disk and Spindle Systems With Asymmetric Bearings," American Society of Mechanical Engineers (ASME), Journal of Applied Mechanics 70:299-302, 2003.
Parker, R.G., "Analytical Vibration of Spinning, Elastic Disk-Spindle Systems," American Society of Mechanical Engineers (ASME), Journal of Applied Mechanics 66:218-224, 1999.
Ruben, S.D., and I.Y. Shen, "Evaulating Vibration Characteristics of a Disk Media Substrate," Journal of Information Storage and Processing Systems 1:281-285, 1999.
Shen, I.Y., "Active Constrained Layer Damping Treatments for Shell Structures: A Deep-Shell Theory, Some Intuitive Results, and an Energy Analysis," Smart Materials and Structures 6:1-13, 1997.
Shen, I.Y., "Bending and Torsional Vibration Control of Composite Beams Through Intelligent Constrained-Layer Damping Treatments," Smart Materials and Structures 4:340-355, 1995.
Shen, I.Y., "Bending-Vibration Control of Composite and Isotropic Plates Through Intelligent Constrained-Layer Treatments," Smart Materials and Structures 3:59-70, 1994.
Shen, I.Y., "Closed-Form Forced Response of a Damped Rotating, Multiple Disks/Spindle System," American Society of Mechanical Engineers (ASME), Journal of Applied Mechanics 64:343-352, 1997.
Shen, I.Y., "Hybrid Damping Through Intelligent Constrained Layer Treatments," American Society of Mechanical Engineers (ASME), Journal of Vibration and Acoustics 116:341-349, 1994.
Shen, I.Y., "Perturbation Eigensolutions of Elastic Structures With Cracks," American Society of Mechanical Engineers (ASME), Journal of Applied Mechanics 60:438-442, 1993.
Shen, I.Y., "Recent Vibration Issues in Computer Hard Disk Drives," Journal of Magnetism and Magnetic Materials 209:6-9, 2000.

Shen, I.Y., "Response of a Stationary, Damped, Circular Plate Under a Rotating Slider Bearing System," American Society of Mechanical Engineers (ASME), Journal of Vibration and Acoustics 115:65-69, 1993.

Shen, I.Y., "Some Comments on Rocking Motion on Rotating Disk/Spindle Systems," American Society of Mechanical Engineers (ASME), Journal of Applied Mechanics 65:1061-1062.

Shen, I.Y., "Stability and Controllability of Euler-Bernoulli Beams With Intelligent Constrained Layer Treatments," American Society of Mechanical Engineers (ASME), Journal of Vibration and Acoustics 118:70-77, 1996.

Shen, I.Y., "A Variational Formulation, a Work-Energy Relation and Damping Mechanisms of Active Constrained Layer Treatments," American Society of Mechanical Engineers (ASME), Journal of Vibration and Acoustics 119:192-199, 1997.

Shen, I.Y., "Vibration of Elastic Structures With Cracks," American Society of Mechanical Engineers (ASME), Journal of Applied Mechanics 60:414-421, 1993.

Shen, I.Y., "Vibration of Flexible Rotating Disks," The Shock and Vibration Digest 32(4):267-272, 2000.

Shen, I.Y., "Vibration of Rotationally Periodic Structures," Journal of Sound and Vibration 172(4):459-470, 1994.

Shen, I.Y., "Vibration of a Three-Dimensional, Finite Linear, Elastic Solid Containing Cracks," American Society of Mechanical Engineers (ASME), Journal of Applied Mechanics 62:282-288, 1995.

Shen, I.Y., and C.-P. R. Ku, "A Nonclassical Vibration Analysis of a Multiple Rotating Disk and Spindle Assembly," American Society of Mechanical Engineers (ASME), Journal of Applied Mechanics 64:165-174, 1997.

Shen, I.Y., and C.D. Mote, Jr., "Dynamic Analysis of Fitness Linear Elastic Solids Containing Small Elastic Imperfections: Theory With Application to Asymmetric Circular Plates," Journal of Sound and Vibration 155(3):443-465, 1992.

Shen, I.Y., and C.D. Mote, Jr., "Dynamic Analysis of Finite, Three-Dimensional, Linear, Elastic Solids With Kelvin Viscoelastic Inclusions: Theory With Applications to Asymmetrically Damped Circular Plates," Journal of the Acoustical Society of America 91(3):1489-1499, 1992.

Shen, I.Y., and C.D. Mote, Jr., "On the Mechanisms of Instability of a Circular Plate Under a Rotating Spring-Mass-Dashpot System," Journal of Sound and Vibration 148(2):307-318, 1991.

Shen, I.Y., and C.D. Mote, Jr., Modal Analysis of Kelvin Viscoelastic Solids Under Arbitrary Excitation: Circular Plates Under Moving Loads, Journal of the Acoustical Society of America 91:(5)2703-2707, 1992.

Shen, I.Y., and C.D. Mote, Jr., "On the Mode Splitting of Degenerate Mechanical Systems Containing Cracks," Journal of Applied Mechanics 60:929-935, 1993.

Shen, I.Y., and C.D. Mote, Jr., "Parametric Excitation Under Multiple Excitation Parameters: Asymmetric Plates Under a Rotating Spring," International Journal of Solids Structures 29(8):1019-1032, 1992.

Shen, I.Y., and C.D. Mote, Jr., "Parametric Resonances of an Axisymmetric Circular Plate Subjected to a Rotating Mass," Journal of Sound and Vibration 152(3):573-576, 1992.

Shen, I.Y., and C.D. Mote, Jr., "Parametric Resonances of a Circular Plate With Inclusions Subjected to a Rotating Spring," Journal of Sound and Vibration 149(1):164-169, 1991.

Shen, I.Y., and Y. Song, "Stability and Vibration of a Rotating Circular Plate Subjected to Stationary In-Plane Edge Loads," Journal of Applied Mechanics 63:121-127, 1996.

Shen, I.Y., et al., "Torsional Vibration Control of a Shaft Through Active Constrained Layer Damping Treatments," Journal of Vibration and Acoustics 119:504-511, 1997.

Shen, J.-Y., et al., "Vibration of Disk Media at Elevated Temperatures," Journal of Information Storage and Processing Systems 2:307-312, 2000.

Shen, J.-Y., et al., "Vibration of Rotating Disk/Spindle Systems with Flexible Housing/Stator Assemblies," Journal of Sound and Vibration 271:725-756, 2004.

Ting, C., and I.Y. Shen, "Closed Form Solutions to the Vibroacoustic Response of Strip Structures," Journal of the Acoustical Society of America 101(2):968-978, 1997.

Tsay, A.Y., et al., "Free Vibration Analysis of PZT Glide Heads," American Society of Mechanical Engineers (ASME), Journal of Tribology 121:984-988, 1999.

Tseng, C.-W., et al., "Effects of Elevated Temperatures on Rocking Vibration of Rotating Disk and Spindle Systems," American Society of Mechanical Engineers (ASME), Journal of Tribology 121:794-800, 2002.

Tseng, W.-W., et al., "A Unified Approach to Analyze Vibration of Axisymmetric Rotating Structures With Flexible Stationary Parts," American Society of Mechanical Engineers (ASME), Journal of Vibration and Acoustics 127:125-138, 2005.

Tseng, J.-Y. et al., "Vibration of Rotating-Shaft HDD Spindle Motors With Flexible Stationary Parts," IEEE Transactions on Magnetics 39(2):794-799, 2003.

Yang, J., et al., Numerical Study of Dynamic Resonance Interactions Induced by Ball-Bearing Defect Frequencies, Journal of Information Storage and Processing Systems 3:79-87, 2001.

Yellin, M., and I.Y. Shen, A Self-Sensing Active Constrained Layer Damping Treatment for a Euler-Bernoulli Beam, Smart Materials and Structure 5:628-637, 1996.

Yellin, J.M., et al., "An Analytical and Experimental Analysis for a One-Dimensional Passive Stand-Off Layer Damping Treatment," American Society of Mechanical Engineers (ASME), Journal of Vibration and Acoustics 122:440-447, 2000.

Meirovitch, L., Elements of Vibration Analysis, McGraw Hill, Inc., New York, 1975, Chap. 7.4, "Assumed-Modes Method," pp. 266-269.

* cited by examiner

METHOD FOR PREDICTING VIBRATIONAL CHARACTERISTICS OF ROTATING STRUCTURES

CROSS-REFERENCE TO RELATED APPLICATIONS

This application claims the benefit of Provisional Applications No. 60/473,748, filed May 27, 2003, and No. 60/517,684, filed Nov. 6, 2003, the benefit of which is hereby claimed under 35 U.S.C. § 119.

STATEMENT REGARDING FEDERALLY-SPONSORED RESEARCH OR DEVELOPMENT

The present invention was made in the course of research that was supported by the National Science Foundation under grants CMS-0244116 and CMS-9820745. The United States Government may have certain rights to the invention herein.

FIELD OF THE INVENTION

This invention relates to methods and systems for calculating the vibrational characteristics of devices having rapidly rotating components, such as computer hard disk drives, jet engines, and the like.

BACKGROUND OF THE INVENTION

Rotating machines appear everywhere in our daily life, from high-tech applications, such as jet engines and computer hard disk drives ("HDD") to ordinary household appliances, such as washing machines and refrigerator compressors. Rotating machines typically include a rotating part (rotor), a stationary part (stator or housing), and bearings. The rotors will have very different geometry for various applications. In jet engines, for example, the rotors are generally slender rods carrying relatively heavy disks with turbine blades. For an HDD, the rotor is generally a plurality of flexible disks attached in a spaced stack to a hub. Similarly, the stator or housing may have wide-varying geometry. The bearings connect or interface between the rotating and stationary parts. The bearings may include radial and thrust bearings to take the various loads during use. Typical bearing types include rolling element bearings, such as ball bearings, and hydrodynamic (fluid) bearings.

Traditional vibration analysis of rotating machines rests on several major assumptions. First, the rotors often have simplified geometry. For example, turbine engines are often modeled as rotating flexible rods with rigid or flexible disks. Conversely, HDDs are frequently modeled as rotating flexible disks on rigid hubs. As a result, vibration analysis models developed for one application often cannot be applied to other applications. Moreover, real rotors usually have much more complicated geometry than that utilized in existing models. Therefore, vibration analysis based on the simplified geometry often cannot predict responses accurately. Generally, the modeling of the housing and/or stator is minimal, to simplify the analysis. For example, the housing is often assumed to be rigid in modeling HDD systems. For jet engines, the housing is often modeled as a simple lumped-parameter system with a few degrees of freedom. Forced responses predicted from these simplified models may lose accuracy, even when the excitation frequency is low.

For the past decade, rapid technology advances in various industries call for more powerful vibration analysis tools for rotating machines. For example, high-speed, high-density HDDs require accurate geometric design of housing and rotors to meet stringent vibration specifications. For modem high-thrust turbine engines, housing flexibility can affect rotor performance considerably. All these new developments require greater vibrational analysis accuracy and challenge the assumptions made in traditional vibration analysis of rotating machines. Here is a specific example encountered in the HDD industry.

FIG. 1 shows a simplified model of an HDD spindle motor. The rotor consists of a rigid hub, two elastic disks (modeled by the classical plate theory), and a cantilever shaft (modeled as a Euler-Bernoulli beam). The stator is assumed to be rigid. The ball bearings are modeled as linear springs and dampers. In addition, the rotor spins with constant speed $\omega_3$. With these assumptions, the equations of motion have been derived using Lagrange's equation. FIG. 2 compares the theoretical natural frequencies of the rotor with experimental measurements as a function of the spin speed. Note that there is a significant discrepancy (about 15%) between the theoretical and experimental results for the first pair of modes denoted by (0,1), which are critical modes controlling read/write accuracy in hard disk drives.

The primary option to such vibrational analyses of an HDD spindle motor in spindle design is trial-and-error methods that are time-consuming and expensive. The time and expense limit the number of different rotor system designs that can be studied. As a result, the dynamic performance cannot be optimized with such few samples. Moreover, experimental evidence suggests that the vibrational response of the rotor may be significantly impacted by the flexible response of the fixed components, such as the base casting and the top cover. This implies that, with proper design of the fixed components, the rotor performance can be improved. However, existing disk/spindle vibration models do not include the flexibility of the fixed components and, therefore, are not effective for optimizing the dynamic response of the whole hard disk drive.

SUMMARY OF THE INVENTION

Motivated by the industrial needs and academic challenges, the present invention is directed to a unified approach to analyze vibration of rotating machines. The unified approach will be valid for rotors and stators with arbitrary geometry and complexity. There are three complementary elements that make the unified approach possible. First, a complete set of basis must be available to discretize vibration (e.g., infinitesimal displacement field) of the spinning rotor. One such set of basis is normal vibration modes of the corresponding stationary rotor. To accommodate complex rotor geometry, the normal vibration modes can be obtained through finite element analyses ("FEA"), for example. Similarly, a complete set of basis exists for the stationary housing. Second, use of Lagrange's equation and discretization will lead to a set of gyroscopic differential equations of motion. Finally, the equations of motion may be integrated in modal space using a finite element analysis. A derivation and application of the method for analyzing an apparatus with an axisymmetric rotor and flexible stationary parts are presented in the related U.S. Provisional Application No. 60/473,748, which is hereby incorporated by reference. The method is extended to asymmetric rotors and periodic rotors in U.S. Provisional Application No. 60/517,684, which also is hereby incorporated by reference.

For the present invention, the equations of motion are derived by considering the rotating part, stationary part, and the bearings, individually. For the rotating and stationary parts, the kinetic and potential energies are derived and discretized in terms of a complete set of normal modes. The gyroscopic equations of motion are derived through Lagrange's equation.

A method is disclosed for improving the vibrational characteristics of an apparatus having a rotating component, for example and not by way of limitation, hard disk drives, jet engine and/or jet engine components, motors, and the like. In particular, a method is disclosed wherein a model of the device, including the rotating component, is analyzed to determine some or all of the vibrational characteristics of the device, including accounting for the centrifugal and gyroscopic effects, by solving the equations of motion for the model, and the resulting information is used to improve the design of the apparatus.

More particularly, in an embodiment of the present invention, the a computer model of a first version of the device is generated. The model may include, for example, a finite element grid representing the first version of the device. A set of independent vibration shape functions for the rotating element are selected, and the stationary natural frequencies of the rotating element corresponding to the independent vibration shape functions are calculated. The vibration mode shape functions may be, for example, the vibration mode shape. The gyroscopic coefficients of the rotating element are calculated from the independent vibration shape functions, and the gyroscopic equations of motion are solved to obtain some of the vibrational characteristics of the rotating element through generalized coordinates corresponding to the independent vibration shape functions. A convenient method of obtaining the gyroscopic equations of motion is through use of the Lagrangian equation. The obtained vibrational characteristics are then transformed from modal space into three-dimensional physical space, and are used to modify the first version of the device.

In another embodiment of the invention a computer model of a first version of a device having a rotating element, a stationary element, and at least one bearing disposed between the rotating element and the non-rotating element is generated. A first set of independent vibration shape functions for the rotating element are selected, and the stationary natural frequencies of the rotating element corresponding to the first set of independent vibration shape functions are calculated. The gyroscopic coefficients of the rotating element from the first set of independent vibration shape functions are calculated. A second set of independent vibration shape functions for the non-rotating element are selected, and the natural frequencies of the non-rotating element corresponding to the second set of independent vibration shape functions are calculated. The set of gyroscopic equations of motion are then solved to obtain some of the vibrational characteristics of the rotating element through generalized coordinates corresponding to the first and second sets of independent vibration shape functions. The obtained vibrational characteristics are transformed from modal space into three-dimensional physical space, and are used in modifying the first version of the device using the vibrational characteristics to generate a second version of the device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

A method for calculating the vibrational characteristics of devices having a rapidly rotating component, such as a rotor, will be described with reference to the figures, wherein like numbers indicate like elements. Vibrational characteristics, as used herein, includes the natural frequencies and mode shapes of the device, and may also include the mechanical responses of the device to externally applied forces and/or prescribed motions applied to a device having a flexible rotating component. The disclosed method is suitable for analyzing apparatuses such as hard disk drives, jet engines, motors, spin-stabilized satellites, and the like. As will be readily apparent to persons of skill in the art, the accurate analysis and prediction of the vibrational response of such apparatus—such as the elastic deformation and relative motion between the various elements, the frequency response, time-domain response, natural frequency, vibration mode shapes and damping factors—are important to the component design process.

The present method is developed for the general case of analyzing an apparatus having an asymmetric rotor supported within a flexible, stationary housing. The method is then applied to the simplified special case of a rotating asymmetric rotor with simplified boundary conditions, and wherein the rotor is rotationally periodic, such as a compressor or turbine stage for a jet engine. In this special case, the computational requirements are significantly reduced because the coefficients in the resulting equations of motion reduce to constants.

Finally, the application of the methods disclosed herein to the design of rotating apparatus will be discussed.

1. Formulation of the Stationary Part

An apparatus, such as a disk drive, having a rotating part and a stationary part, is considered. The stationary part is modeled as an elastic structure with arbitrary geometry, wherein the stationary part may be subject to externally applied motion, which may be thought of, for example, as mounting the apparatus onto a rigid shaker table that provides linear and angular base excitations. Let O be a convenient reference point on the stationary part. With O being the origin, one can define an inertia frame XYZ with XY plane being parallel to the shaker table, initially. In addition, the XYZ frame has unit vectors I, J, and K.

Figure 1:
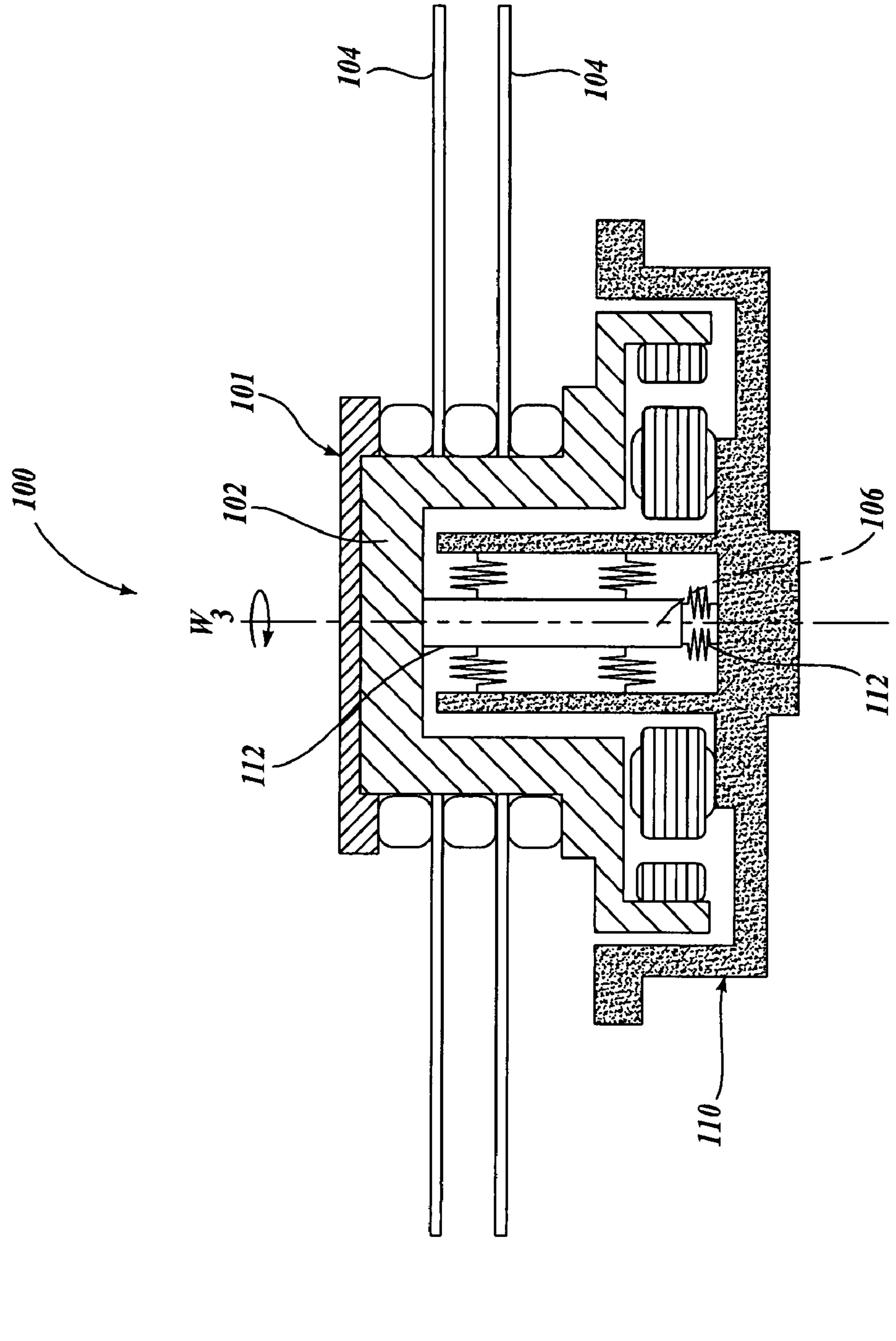
FIG. 1 shows a simplified model of a hard disk drive spindle motor that may be analyzed using the method of the present invention.
Figure 2:
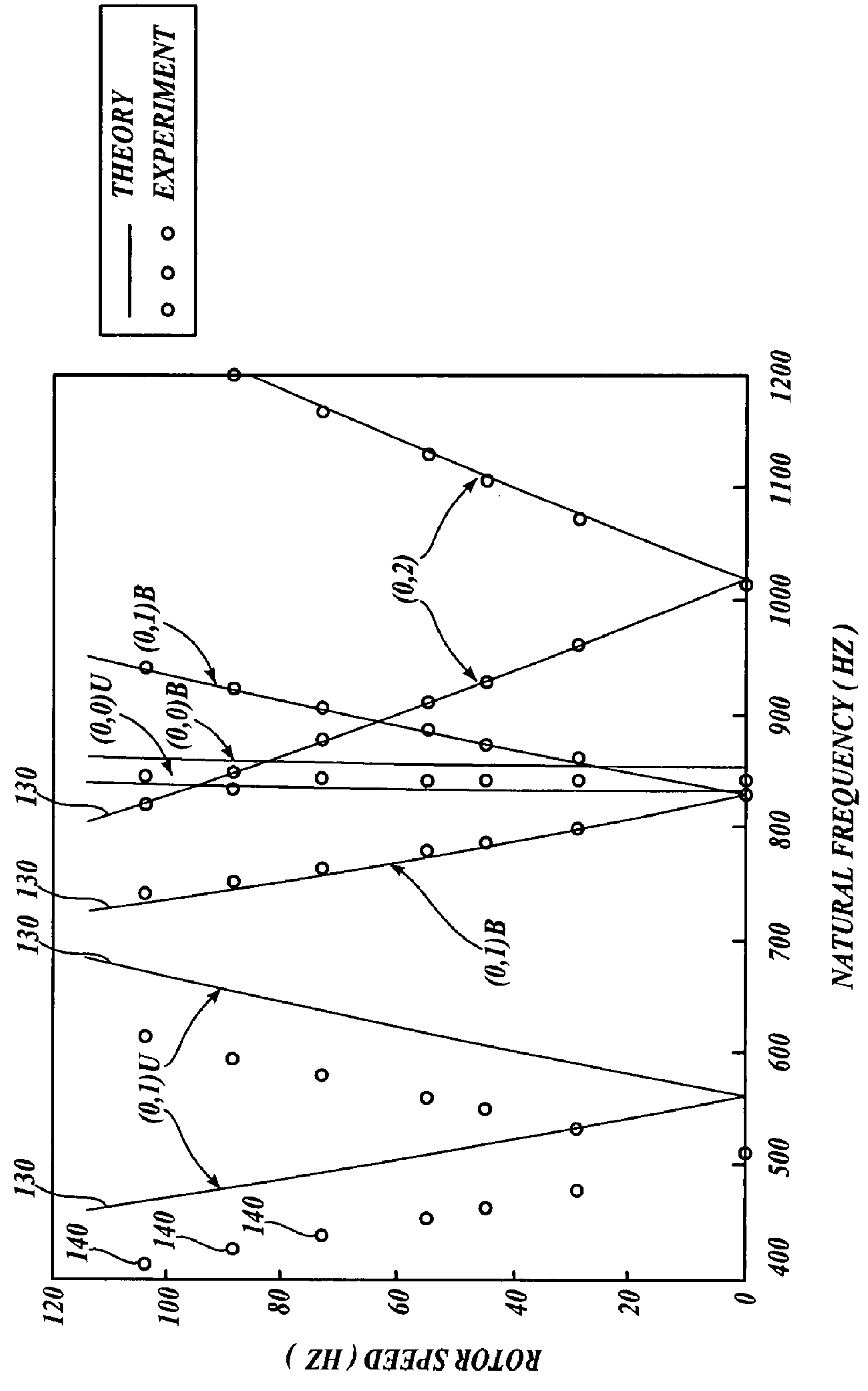
FIG. 2 is a Campbell plot comparing typical calculated natural frequencies of a hard drive rotor, such as that shown in FIG. 1, calculated using prior art methods, with typical experimental measurements of natural frequencies as a function of the spin speed.
Figure 3:
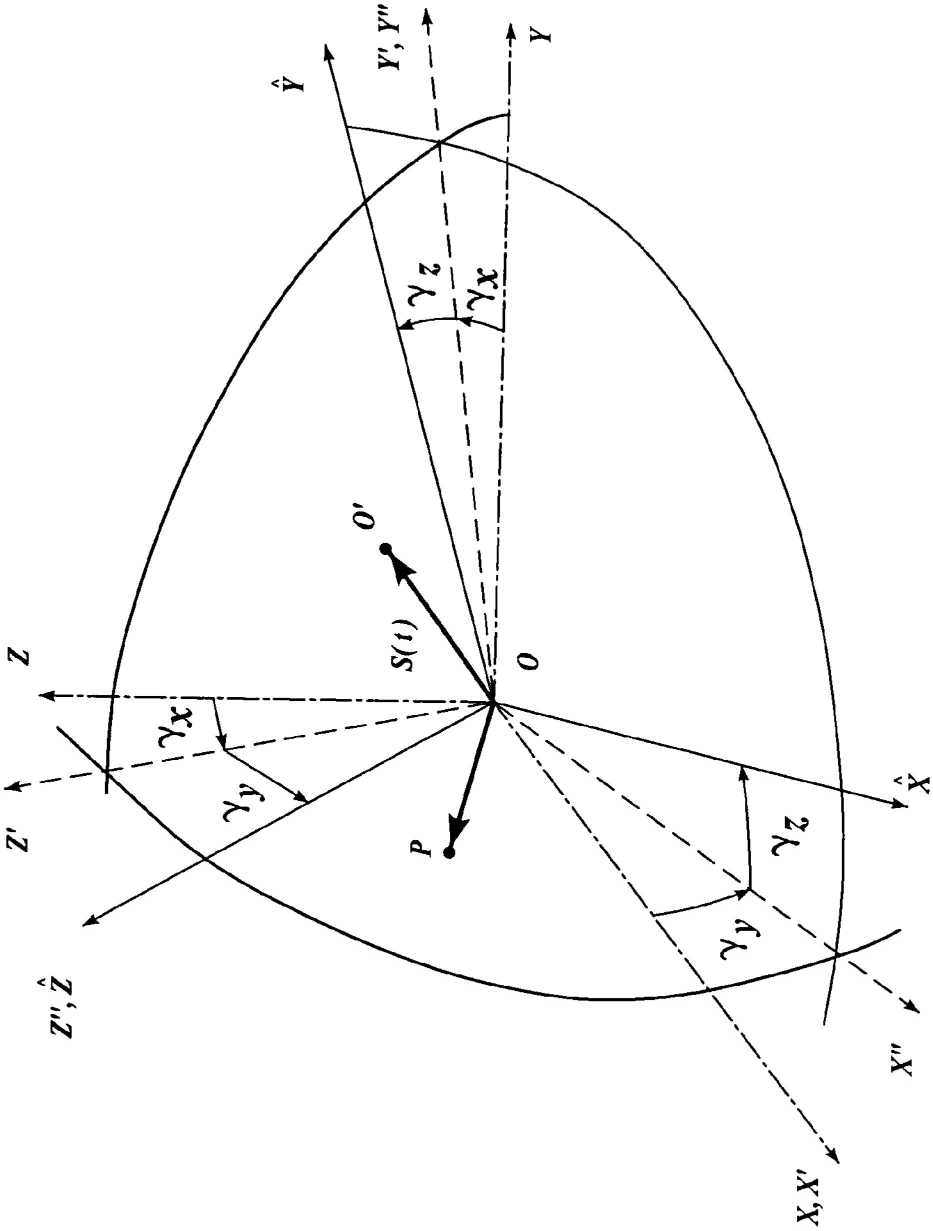
FIG. 3 illustrates prescribed rotational base excitation ($\gamma_x$, $\gamma_y$, $\gamma_z$) and linear base excitation s(t)

The stationary part is subjected to a rigid-body base excitation in the form of prescribed three-dimensional infinitesimal rotations $\gamma_x$, $\gamma_y$, and $\gamma_z$, as shown in FIG. 3, which shows a first rotation about the X axis, followed by a rotation about the new Y' axis, and then a rotation about the new Z" axis. Due to the rigid-body rotations, the stationary part rotates to a new set of coordinates $\hat{X}\hat{Y}\hat{Z}$ with unit vectors $\hat{I}$, $\hat{J}$, and $\hat{K}$. For convenience, the coordinates $\hat{X}\hat{Y}\hat{Z}$ will be termed "shaker frame" herein. For infinitesimal rotation, the coordinate systems XYZ and $\hat{X}\hat{Y}\hat{Z}$ are related through $$\begin{pmatrix} \hat{I} \\ \hat{J} \\ \hat{K} \end{pmatrix} \approx \begin{bmatrix} 1 & \gamma_z & -\gamma_y \\ -\gamma_z & 1 & \gamma_x \\ \gamma_y & -\gamma_x & 1 \end{bmatrix} \begin{pmatrix} I \\ J \\ K \end{pmatrix} \tag{1}$$

The angular velocity and acceleration of the shaker frame, respectively, are $$\omega_{\hat{X}\hat{Y}\hat{Z}} \approx \dot{\gamma}_x \hat{I} + \dot{\gamma}_y \hat{J} + \dot{\gamma}_z \hat{K} \tag{2}$$

and $$\dot{\omega}_{\hat{X}\hat{Y}\hat{Z}} \approx \ddot{\gamma}_x \hat{I} + \ddot{\gamma}_y \hat{J} + \ddot{\gamma}_z \hat{K} \tag{3}$$

In addition to the angular base excitations, the stationary part is also, in general, subjected to a linear base excitation s(t) defined as $$s(t) \equiv s_x(t) I + s_y(t) J + s_z(t) K \tag{4}$$

As a result of the linear base excitation, the origin O moves to an new position O', as indicated in FIG. 3.

Now consider an arbitrary point P on the stationary part. The motion of point P consists of two parts. One is the rigid-body motion consistent with the base excitations. The other is an elastic deformation superimposed on the rigid-body motion. When the base excitation is absent, the location of P is defined through the position vector $$r \equiv r_x I + r_y J + r_z K \tag{5}$$

With the angular base excitations, the rigid-body rotation causes point P to move to its new position $\hat{r}$ defined as $$\hat{r} \equiv r_x \hat{I} + r_y \hat{J} + r_z \hat{K} \tag{6}$$

Therefore, the rigid-body displacement for point P is $$R_{P'} \equiv s(t) + (\hat{r} - r) \tag{7}$$

which consists of infinitesimal translation and rotation.

Let $W^{(B)}(\hat{r},t)$ be the elastic deformation of the stationary part at point P, where the superscript (B) refers to the stationary base. The elastic deformation $W^{(B)}(\hat{r},t)$ can be approximated in terms of $n_b$ vibration modes of the stationary part as $$W^{(B)}(\hat{r}, t) \approx \sum_{n=1}^{n_b} W_n^{(B)}(\hat{r}) q_n^{(B)}(t) \tag{8}$$

where $$W_n^{(B)}(\hat{r}) \equiv W_{xn}^{(B)}(\hat{r})\hat{I} + W_{yn}^{(B)}(\hat{r})\hat{J} + W_{zn}^{(B)}(\hat{r})\hat{K} \tag{9}$$

is the n-th vibration mode shape of the stationary part and $q_n^{(B)}(t)$ is the corresponding generalized coordinate. In addition, the mode shapes satisfy the orthonormality conditions $$\int W_m^{(B)}(\hat{r}) \cdot W_n^{(B)}(\hat{r}) dm = \delta_{mn} \tag{10}$$

and $$\int V_b[W_m^{(B)}(\hat{r}), W_n^{(B)}(\hat{r})] dV = [\omega_n^{(B)}]^2 \delta_{mn} \tag{11}$$

where $\delta_{mn}$ is the Kronecker delta, $\omega_n^{(B)}$ is the natural frequency of the n-th vibration mode of the stationary part, and $V_b[\bullet]$ is the potential energy operator for the stationary part.

With the rigid-body motion $R_{P'}$ and elastic deformation $W^{(B)}(\hat{r}, t)$, the displacement of P is $$R_P \equiv s(t) + (\hat{r} - r) + W^{(B)}(\hat{r}, t) \tag{12}$$

As a result, the velocity of point P is $$\dot{R}_P = \dot{s} + \omega_{\hat{X}\hat{Y}\hat{Z}} \times \hat{r} + \sum_{n=1}^{n_b} W_n^{(B)}(\hat{r}) \dot{q}_n^{(B)}(t) + \sum_{n=1}^{n_b} [\omega_{\hat{X}\hat{Y}\hat{Z}} \times W_n^{(B)}(\hat{r})] q_n^{(B)}(t) \tag{13}$$

where (8) has been used. If higher order terms are neglected, the kinetic energy of the stationary part becomes $$T_B = \frac{1}{2} m_B (\dot{s}_x^2 + \dot{s}_y^2 + \dot{s}_z^2) + \frac{1}{2} \omega_{\hat{X}\hat{Y}\hat{Z}} \cdot I_B \cdot \omega_{\hat{X}\hat{Y}\hat{Z}} + \frac{1}{2} \sum_{n=1}^{n_b} [\dot{q}_n^{(B)}]^2 + \sum_{n=1}^{n_b} (\dot{s} \cdot J_{an}^{(B)}) \dot{q}_n^{(B)} + \sum_{n=1}^{n_b} (\omega_{\hat{X}\hat{Y}\hat{Z}} \cdot J_{bn}^{(B)}) \dot{q}_n^{(B)} + \dot{s} \cdot \omega_{\hat{X}\hat{Y}\hat{Z}} \times J_{s1}^{(B)} \tag{14}$$

where $m_B$ is the mass of the stationary part, and $I_B$ is the mass moment of inertia tensor of the stationary part relative to the origin O. Also, $$J_{s1}^{(B)} \equiv \int \hat{r} dm \tag{15}$$

$$J_{an}^{(B)} \equiv \int W_n^{(B)}(\hat{r}) dm \tag{16}$$

and $$J_{bn}^{(B)} \equiv \int \hat{r} \times W_n^{(B)}(\hat{r}) dm \tag{17}$$

Finally, the potential energy of the stationary part is $$V_B = \frac{1}{2} \int V_b[W^{(B)}, W^{(B)}] dV = \frac{1}{2} \sum_{n=1}^{n_b} [\omega_n^{(B)} q_n^{(B)}(t)]^2 \tag{18}$$

2. Formulation of the Rotating Part

Figure 4:
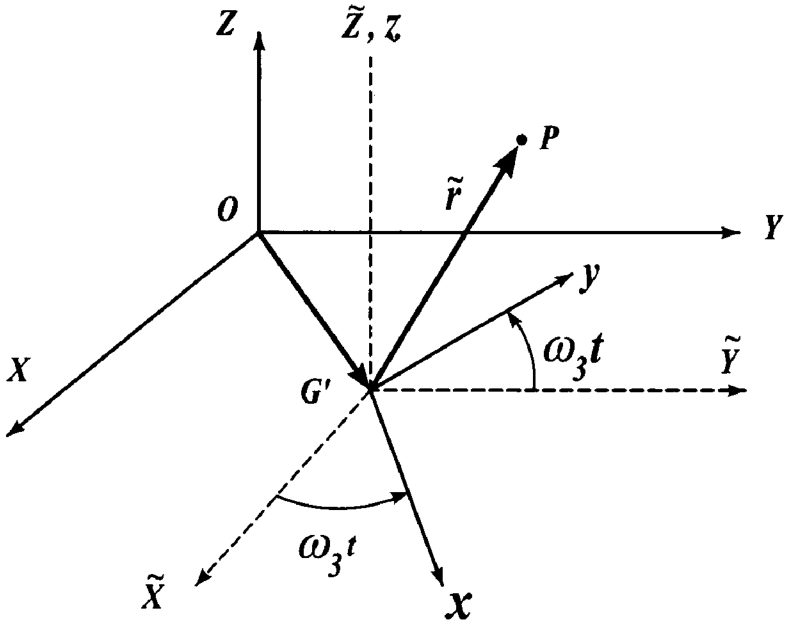
FIG. 4 illustrates a coordinate systems for the rotating part.

The rotating part is modeled as an asymmetric elastic solid. The rotating part has arbitrary geometry with centroid G located on the spin axis. In other words, the rotor is perfectly balanced. Moreover, the rotating part can undergo rigid-body motion as well as elastic deformation. To formulate the motion of the rotating part, first define a virgin state for reference. In the virgin state, the system (consisting of the rotor, the housing, and the bearings) experiences no elastic deformation and no rigid-body motion except the spin of the rotor. Moreover, let G' denote the location of the centroid in the virgin state (see FIG. 4). (In other words, G and G' coincide in the virgin state, but will correspond to two different points during an actual motion.)

With G' being the origin, one can define an inertia Cartesian coordinate system $\tilde{X}\tilde{Y}\tilde{Z}$ for the rotating part with $\tilde{Z}$ being the spin axis in the virgin state. (In actual motion, the bearings can deform and the rotor might wobble; therefore, $\tilde{Z}$ may not be the spin axis.) Also, one can define a rotating coordinate system xyz with constant angular velocity $\omega_3$. To be convenient, also assume that xyz coincides with the principal axes of the rotating part in the virgin state. Note that the xyz axes are not attached to the rotating part, because the rotating part can rock and translate but the xyz axes do not. Nevertheless, the xyz axes are the best coordinate system to describe the motion of the rotating part. Let i, j, and k be the unit vectors of the xyz coordinate system. Then $$\begin{pmatrix} i \\ j \\ k \end{pmatrix} = \begin{bmatrix} \cos\omega_3 t & \sin\omega_3 t & 0 \\ -\sin\omega_3 t & \cos\omega_3 t & 0 \\ 0 & 0 & 1 \end{bmatrix} \begin{pmatrix} I \\ J \\ K \end{pmatrix} \tag{19}$$

Let us now consider the motion of a point P on the rotating part. In the virgin state, the position of P is defined by vector $\tilde{r}$ (FIG. 4), where $$\tilde{r}=\tilde{r}_x i+\tilde{r}_y j+\tilde{r}_z k \tag{20}$$

In the deformed state, the position of and arbitrary point P with respect to the inertia frame XYZ becomes $$R_P^{(S)}(\tilde{r},t)=\overrightarrow{OG'}+\tilde{r}+W^{(S)}(\tilde{r},t) \tag{21}$$

where $W^{(S)}(\tilde{r},t)$ is the displacement of P that includes rigid-body translation, rigid-body rocking, and elastic deformation.

Under the coordinate system xyz, there exists several sets of complete mode shapes. For example, when the rotor is stationary, undamped, and subjected to free boundary conditions, the rotor will have a set of complete mode shapes $$W_n^{(S)}(\tilde{r})\equiv W_{xn}^{(S)}(\tilde{r})i+W_{yn}^{(S)}(\tilde{r})j+W_{zn}^{(S)}(\tilde{r})K \tag{22}$$

with natural frequencies $\omega_n^{(S)}$, n=0, 1, 2, . . . . For rotors with complicated geometry, $W_n^{(S)}(\tilde{r})$ and $\omega_n^{(S)}$ can be calculated through finite element analyses, for example. Moreover, these mode shapes are orthogonal satisfying $$\int W_m^{(S)}(\tilde{r})\cdot W_n^{(S)}(\tilde{r})dm_s=\delta_{mn} \tag{23}$$

and $$\int V_S[W_m^{(S)}(\tilde{r}),W_n^{(S)}(\tilde{r})]dV_s=[\omega_n^{(S)}]^2\delta_{mn} \tag{24}$$

where $\delta_{mn}$ is the Kronecker Delta and Vs[●] is the potential energy operator for the rotor.

It will be appreciated by persons of skill in the art that other methods could alternatively be used to generate a complete set of mode shapes. For example, a fixed boundary condition for the rotating part at the bearings could be used. Furthermore, the present method would work even using assumed vibration shapes (independent vibration shape functions) for the rotating part. MEIROVITCH, L., *Elements of Vibration Analysis*, McGraw Hill, Inc., New York, 1975, Chap. 7.4, "Assumed-Modes Method," pp. 266-269. Moreover, the independent vibration shape functions do not need to satisfy all the actual boundary conditions of the rotating part. These and other similar options for generating a suitable set of mode shapes are known in the art.

Note that the mode shapes $W_n^{(S)}(\tilde{r})$ also include six infinitesimal rigid-body modes with zero natural frequencies. Let us label the zero-th mode as the infinitesimal rigid-body spin of the rotor, i.e., $$W_0^{(S)}(\tilde{r}) \equiv \frac{1}{\sqrt{\bar{I}_3}}(-\tilde{y}i+\tilde{x}j) \tag{25}$$

where $\bar{I}_3$ is the centroidal mass moment of inertia about the spin axis. Because the vibration mode shapes are complete, any infinitesimal vibration can be expanded in terms of $W_n^{(S)}(\tilde{r})$. Therefore, the vibration $R_P^{(S)}(\tilde{r},t)$ of the rotor in (21) can be approximated as $$R_P^{(S)}(\tilde{r},t) \approx \overline{OG'}+\tilde{r}+\sum_{n=1}^{n_S} W_n^{(S)}(\tilde{r})q_n^{(S)}(t) \tag{26}$$

where $q_n^{(S)}(t)$ is the generalized coordinates whose response is to be determined, and $n_s$ is the number of modes retained in the series for approximation. Note that the rigid-body spin of the rotor $W_0^{(S)}(\tilde{r})$ does not appear in $R_P^{(S)}(\tilde{r},t)$, because the spin of the rotor is redundant and has been described by the rotation of the coordinate system xyz.

With (26), the velocity of point P is $$\dot{R}_P^{(S)}(\tilde{r},t) = \omega\times\tilde{r}+\sum_{n=1}^{n_S} W_n^{(S)}(\tilde{r})\dot{q}_n^{(S)}(t)+\sum_{n=1}^{n_S}\left[\omega\times W_n^{(S)}(\dot{\tilde{r}})\right]q_n^{(S)}(t) \tag{27}$$

where $\omega=\omega_3 k$. With the velocity field (27), the kinetic energy of the rotor is $$T_S = \frac{1}{2}\bar{I}_3\omega_3^2+\frac{1}{2}\sum_{n=1}^{n_S}[\dot{q}_n^{(S)}]^2+\frac{1}{2}\omega_3^2\sum_{n=1}^{n_S}\sum_{m=1}^{n_S}\lambda_{mn}q_m^{(S)}(t)q_n^{(S)}(t)+ \omega_3\sum_{n=1}^{n_S}J_{bn}^{(S)}\dot{q}_n^{(S)}(t)+\omega_3^2\sum_{n=1}^{n_S}J_{cn}^{(S)}q_n^{(S)}(t)+\omega_3\sum_{n=1}^{n_S}\sum_{m=1}^{n_S}g_{nm}q_m^{(S)}(t)\dot{q}_n^{(S)}(t) \tag{28}$$

where $$\lambda_{mn}=\lambda_{nm}\equiv\delta_{mn}-\int W_{mz}^{(S)}(\tilde{r})W_{nz}^{(S)}(\tilde{r})dm \tag{29}$$

$$J_{bn}^{(S)}\equiv k\cdot\int\tilde{r}\times W_n^{(S)}(\tilde{r})dm \tag{30}$$

$$J_{cn}^{(S)}\equiv\int[\tilde{r}\cdot W_n^{(S)}(\tilde{r})-\tilde{r}_z W_{nz}^{(S)}(\tilde{r})]dm \tag{31}$$

$$g_{mn}=-g_{nm}\equiv k\cdot\int[W_m^{(S)}(\tilde{r})\times W_n^{(S)}(\tilde{r})]dm \tag{32}$$

In addition, $\lambda_{mn}$ are the centrifugal stiffening/softening coefficients, and $g_{nm}$ are the gyroscopic coefficients for the rotating part. For (29) to (32), the integration is carried out with respect to the rotating part. Also, $\delta_{mn}$ in (29) is the Kronecker delta. Finally, the potential energy of the rotating part is $$V_S = \frac{1}{2}\int V_s[W^{(S)}, W^{(S)}]dV = \frac{1}{2}\sum_{n=1}^{n_s}[\omega_n^{(S)} q_n^{(S)}(t)]^2 \quad (33)$$

3. Bearing Deformation

The purpose of this section is to derive bearing deformations in terms of $q_n^{(B)}(t)$ and $q_n^{(S)}(t)$. Let A and A' be two mating surfaces of a bearing (e.g., inner race and outer race), where A is on the rotating part and A' is on the stationary part. When the spindle vibrates, the two bearing surfaces move relative to each other. In addition, the relative motion could be linear or angular.

Figure 5:
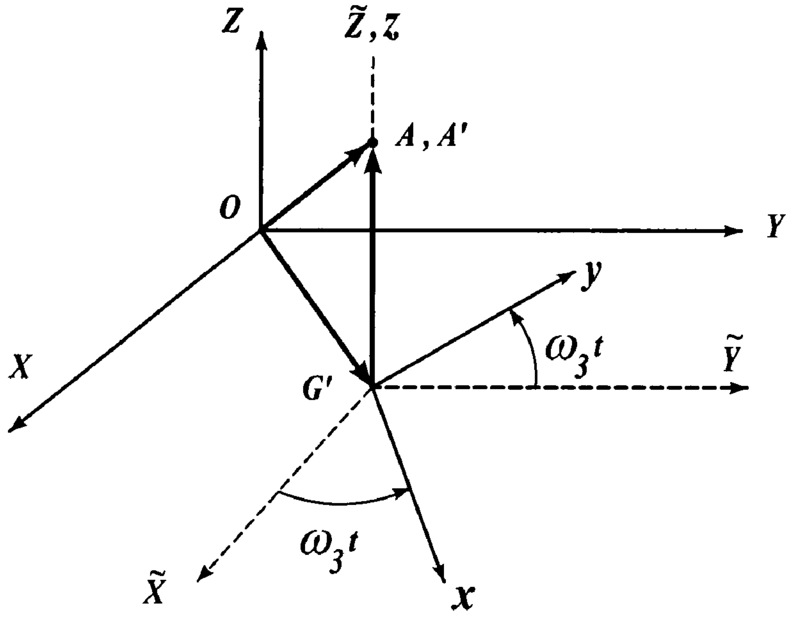
FIG. 5 shows the kinematics to determine bearing deformation.

To determine the bearing deformation, we define the location and orientation of the bearing surfaces first. In the virgin state, the bearing A is undeformed and its position is $$\overrightarrow{OA} \equiv p_x I + p_y J + p_z K \quad (34)$$

where $p_x$, $p_y$, and $p_z$ are the Cartesian coordinates of bearing A with respect to the origin O (see FIG. 5). In the virgin state, also define the relative position of A to G' as $$\tilde{r}_A = \overrightarrow{G'A} \equiv l_x I + l_y J + l_z K \quad (35)$$

where $l_x = l_y = 0$ for a realistic bearing. Moreover, define the relative position of G' to O as $$\overrightarrow{OG'} \equiv t_x I + t_y J + t_z K \quad (36)$$

Note that $\overrightarrow{OG'} + \overrightarrow{G'A} = \overrightarrow{OA}$; therefore, $$t_i + l_i = p_i, i = x, y, z \quad (37)$$

To determine the linear bearing deformation, let $r_A$ and $r_{A'}$ be the position vectors of A and A', respectively. Then $r_A - r_{A'}$ defines the linear bearing deformation. According to FIG. 5 and (26), $$r_A = (t_x I + t_y J + t_z K) + l_z K + \sum_{n=1}^{n_s} W_n^{(S)}(\tilde{r}_A) q_n^{(S)}(t) \quad (38)$$

According to (12), $$r_{A'} = s(t) + (p_x \hat{I} + p_y \hat{J} + p_z \hat{K}) + \sum_{n=1}^{n_b} W_n^{(B)}(\hat{r}_A) q_n^{(B)}(t) \quad (39)$$

Based on (38) and (39), the linear bearing deformation is $$r_A - r_{A'} \equiv \Delta_x I + \Delta_y J + \Delta_z K \quad (40)$$

where $$\Delta_x \equiv -s_x - p_z\gamma_y + p_y\gamma_z + \sum_{n=1}^{n_s}[W_{xn}^{(S)}(\tilde{r}_A)\cos\omega_3 t - W_{yn}^{(S)}(\tilde{r}_A)\sin\omega_3 t] q_n^{(S)}(t) - \sum_{n=1}^{n_b} W_{xn}^{(B)}(\hat{r}_A) q_n^{(B)}(t) \quad (41)$$

-continued $$\Delta_y \equiv -s_y - p_x\gamma_z + p_z\gamma_x + \sum_{n=1}^{n_s}[W_{xn}^{(S)}(\tilde{r}_A)\sin\omega_3 t - W_{yn}^{(S)}(\tilde{r}_A)\cos\omega_3 t] q_n^{(S)}(t) - \sum_{n=1}^{n_b} W_{yn}^{(B)}(\hat{r}_A) q_n^{(B)}(t) \quad (42)$$

and $$\Delta_z \equiv -s_z - p_y\gamma_x + p_x\gamma_y + \sum_{n=1}^{n_s} W_{zn}^{(S)}(\tilde{r}_A) q_n^{(S)}(t) - \sum_{n=1}^{n_b} W_{zn}^{(B)}(\hat{r}_A) q_n^{(B)}(t) \quad (43)$$

Note that the coordinate transformation (19) is used, because $W_n^{(S)}(\tilde{r}_A)$ in (38) is represented in coordinate systems xyz and has to be transformed into the inertia frame XYZ.

For the angular deformation of the bearing, the shaker frame $\hat{X}\hat{Y}\hat{Z}$ attached to the stationary part undergoes an infinitesimal rotation from shaker excitation $$\gamma \approx \gamma_x \hat{I} + \gamma_y \hat{J} + \gamma_z \hat{K} \quad (44)$$

Moreover, the elastic deformation of the stationary part will induce an infinitesimal rigid-body rotation $$\alpha \equiv \alpha_x \hat{I} + \alpha_y \hat{J} + \alpha_z \hat{K} = \frac{1}{2}\nabla \times \sum_{n=1}^{n_b} W_n^{(B)}(\hat{r}_A) q_n^{(B)}(t) \quad (45)$$

where $\hat{r}_A$ is the position vector of A in the shaker frame. Or more explicitly, $$\alpha_x = \sum_{n=1}^{n_b} \frac{1}{2}\left[\frac{\partial W_{zn}^{(B)}}{\partial \hat{Y}} - \frac{\partial W_{yn}^{(B)}}{\partial \hat{Z}}\right]_{\hat{r}=\hat{r}_A} q_n^{(B)}(t) \equiv \sum_{n=1}^{n_b} \alpha_{xn} q_n^{(B)}(t) \quad (46)$$

$$\alpha_y = \sum_{n=1}^{n_b} \frac{1}{2}\left[\frac{\partial W_{xn}^{(B)}}{\partial \hat{Z}} - \frac{\partial W_{zn}^{(B)}}{\partial \hat{X}}\right]_{\hat{r}=\hat{r}_A} q_n^{(B)}(t) \equiv \sum_{n=1}^{n_b} \alpha_{yn} q_n^{(B)}(t) \quad (47)$$

$$\alpha_z = \sum_{n=1}^{n_b} \frac{1}{2}\left[\frac{\partial W_{yn}^{(B)}}{\partial \hat{X}} - \frac{\partial W_{xn}^{(B)}}{\partial \hat{Y}}\right]_{\hat{r}=\hat{r}_A} q_n^{(B)}(t) \equiv \sum_{n=1}^{n_b} \alpha_{zn} q_n^{(B)}(t) \quad (48)$$

Similarly, the rotating part will experience an infinitesimal rigid-body rotation $$\beta \equiv \beta_x i + \beta_y j + \beta_z k = \frac{1}{2}\nabla \times \sum_{n=1}^{n_s} W_n^{(S)}(\tilde{r}_A) q_n^{(S)}(t) \quad (49)$$

where $$\beta_x = \sum_{n=1}^{n_s} \frac{1}{2}\left[\frac{\partial W_{zn}^{(S)}}{\partial y} - \frac{\partial W_{yn}^{(S)}}{\partial z}\right]_{\tilde{r}=\tilde{r}_A} q_n^{(S)}(t) \equiv \sum_{n=1}^{n_s} \beta_{xn} q_n^{(S)}(t) \quad (50)$$

-continued $$\beta_y = \sum_{n=1}^{n_S} \frac{1}{2}\left[\frac{\partial W_{xn}^{(S)}}{\partial z} - \frac{\partial W_{zn}^{(S)}}{\partial x}\right]_{\tilde{r}=\tilde{r}_A} q_n^{(S)}(t) \equiv \sum_{n=1}^{n_S} \beta_{yn} q_n^{(S)}(t) \tag{51}$$

$$\beta_z = \sum_{n=1}^{n_S} \frac{1}{2}\left[\frac{\partial W_{yn}^{(S)}}{\partial x} - \frac{\partial W_{xn}^{(S)}}{\partial y}\right]_{\tilde{r}=\tilde{r}_A} q_n^{(S)}(t) \equiv \sum_{n=1}^{n_S} \beta_{zn} q_n^{(S)}(t) \tag{52}$$

Note that β in (49) is written in the rotating coordinates xyz. Transformnation of β back to the inertia coordinates XYZ via (19) results in $$\beta = \sum_{n=1}^{n_S} [(\beta_{xn}\cos\omega_3 t - \beta_{yn}\sin\omega_3 t)I + (\beta_{xn}\sin\omega_3 t + \beta_{yn}\cos\omega_3 t)J + \beta_{zn}K]q_n^{(S)}(t) \tag{53}$$

The angular displacements of A relative to A' are $$\xi \equiv \xi_x I + \xi_y J + \xi_z K \tag{54}$$

where $$\xi_x = \sum_{n=1}^{n_S} [\beta_{xn}\cos\omega_3 t - \beta_{yn}\sin\omega_3 t]q_n^{(S)}(t) - \sum_{n=1}^{n_b} \alpha_{xn} q_n^{(B)}(t) - \gamma_x \tag{55}$$

$$\xi_y = \sum_{n=1}^{n_S} [\beta_{xn}\sin\omega_3 t - \beta_{yn}\cos\omega_3 t]q_n^{(S)}(t) - \sum_{n=1}^{n_b} \alpha_{yn} q_n^{(B)}(t) - \gamma_y \tag{56}$$

and $$\xi_z = \sum_{n=1}^{n_S} \beta_{zn} q_n^{(S)}(t) - \sum_{n=1}^{n_b} \alpha_{zn} q_n^{(B)}(t) - \gamma_z \tag{57}$$

4. Vector Notation

To keep track of the lengthy derivation, it is beneficial to adopt the following vector notations. Define the vector of generalized coordinates as $$q(t)=[q_B^T(t), q_S^T(t)]^T \tag{58}$$

where $$q_B(t)=[q_1^{(B)}, q_2^{(B)}, \ldots, q_{n_b}^{(B)}]^T \tag{59}$$

and $$q_S(t)=[q_1^{(S)}, q_2^{(S)}, \ldots, q_{n_s}^{(S)}]^T \tag{60}$$

Also, define the vector of shaker excitations as $$f_s(t)=[s_x, s_y, s_z, \gamma_x, \gamma_y, \gamma_z]^T \tag{61}$$

With the vector notation, the linear and angular bearing deformations can be rewritten as $$\Delta_b \equiv \begin{pmatrix} \Delta_x \\ \Delta_y \\ \Delta_z \\ \xi_x \\ \xi_y \end{pmatrix} = h_b f_s(t) + B_b(t)q(t) \tag{62}$$

where $$h_b = \begin{bmatrix} -1 & 0 & 0 & 0 & -p_z & p_y \\ 0 & -1 & 0 & p_z & 0 & -p_x \\ 0 & 0 & -1 & -p_y & p_x & 0 \\ 0 & 0 & 0 & -1 & 0 & 0 \\ 0 & 0 & 0 & 0 & -1 & 0 \end{bmatrix} \tag{63}$$

and $$B_b(t) \equiv B_b^{(0)} + B_b^{(1)} \cos\omega_3 t + B_b^{(2)} \sin\omega_3 t \tag{64}$$

with $$B_b^{(0)} = \begin{bmatrix} -W_x^{(B)}(\hat{r}_A) & 0 \\ -W_y^{(B)}(\hat{r}_A) & 0 \\ -W_z^{(B)}(\hat{r}_A) & W_z^{(S)}(\tilde{r}_A) \\ -\alpha_x & 0 \\ -\alpha_y & 0 \end{bmatrix} \tag{65}$$

$$B_b^{(1)} = \begin{bmatrix} 0 & W_x^{(S)}(\tilde{r}_A) \\ 0 & W_y^{(S)}(\tilde{r}_A) \\ 0 & 0 \\ 0 & \beta_x \\ 0 & \beta_y \end{bmatrix} \tag{66}$$

and $$B_b^{(2)} = \begin{bmatrix} 0 & -W_y^{(S)}(\tilde{r}_A) \\ 0 & W_x^{(S)}(\tilde{r}_A) \\ 0 & 0 \\ 0 & -\beta_y \\ 0 & \beta_x \end{bmatrix} \tag{67}$$

In (65), (66), and (67), $$W_i^{(B)}(\hat{r}_A) \equiv [W_{i1}^{(B)}(\hat{r}_A), W_{i2}^{(B)}(\hat{r}_A), \ldots, W_{in_b}^{(B)}(\hat{r}_A)] \tag{68}$$

and $$W_i^{(S)}(\tilde{r}_A) \equiv [W_{i1}^{(S)}(\tilde{r}_A), W_{i2}^{(S)}(\tilde{r}_A), \ldots, W_{in_s}^{(S)}(\tilde{r}_A)] \tag{69}$$

where i=x, y, z. Also, $$\alpha_i \equiv [\alpha_{i1}, \alpha_{i2}, \ldots, \alpha_{in_b}] \tag{70}$$

and $$\beta_i \equiv [\beta_{i1}, \beta_{i2}, \ldots, \beta_{in_s}] \tag{71}$$

where i=x, y.

5. Generalized Forces

Generalized forces in the unified approach consist of generalized bearing forces, generalized forces from the stationary part, generalized forces from the rotating part, and generalized damping forces. They are described individually as follows.

5.1 Generalized Bearing Forces

For each bearing, the bearing forces consist of three force components and two moment components. Moreover, the bearing forces are linear combination of spring forces and damping forces described by $$F_b \equiv \begin{pmatrix} F_{xb} \\ F_{yb} \\ F_{zb} \\ M_{xb} \\ M_{yb} \end{pmatrix} = -K_b\Delta_b - C_b\dot{\Delta}_b \tag{72}$$

where $K_b$ and $C_b$ are 5×5 stiffness and damping matrices. The virtual work done by the bearing forces is $$\delta W_b = \Sigma F_b^T \delta\Delta_b = -\delta q^T Q_b \tag{73}$$

where the summation sums over all the bearings and $Q_b$ is the generalized bearing force vector. Substitution of (62) and (72) into (73) yields $$Q_b = K_B(t)q + H_B(t)f_s + C_B(t)\dot{q} + G_B(t)\dot{f}_s \tag{74}$$

where $$K_B(t) \equiv \Sigma B_b^T(t)[K_b B_b(t) + C_b \dot{B}_b(t)] \tag{75}$$

$$H_B(t) \equiv \Sigma B_b^T(t) K_b h_b \tag{76}$$

$$C_B(t) \equiv \Sigma B_b^T(t) C_b B_b(t) \tag{77}$$

$$G_B(t) \equiv \Sigma B_b^T(t) C_b h_b \tag{78}$$

Although linear bearings are described above, and used in the preferred embodiment of the present method, it will be appreciated that the method would also work using non-linear bearing models, such as those encountered in fluid-dynamic bearings in hard disk drives under sever shock environments.

5.2 Generalized Forces from Stationary Part

Let us consider a concentrated load $f_B$ in the form of $$f_B = f_{Bx}\hat{I} + f_{By}\hat{J} + f_{Bz}\hat{K} \tag{79}$$

The force $f_B$ is fixed in the shaker frame and acts on a point B on the stationary part with position vector $$\hat{r}_B \equiv \overrightarrow{OB} = x_1\hat{I} + y_1\hat{J} + z_1\hat{K} \tag{80}$$

According to (12), the displacement $U_B$ of B can be arranged in a matrix form $$u_B = B_B q + D_B f_s \tag{81}$$

where $$B_B = \begin{bmatrix} W_x^{(B)}(\hat{r}_B) & 0 \\ W_y^{(B)}(\hat{r}_B) & 0 \\ W_z^{(B)}(\hat{r}_B) & 0 \end{bmatrix} \tag{82}$$

$$D_B = \begin{bmatrix} 1 & 0 & 0 & 0 & z_1 & -y_1 \\ 0 & 1 & 0 & -z_1 & 0 & x_1 \\ 0 & 0 & 1 & y_1 & -x_1 & 0 \end{bmatrix} \tag{83}$$

Therefore, the virtual work done is $$\delta W_B = \delta u_B^T f_B = \delta q^T B_B^T f_B \tag{84}$$

5.3 Generalized Forces from Rotating Part

The contents of this section are primarily for concentrated loads. The virtual work done by distributed forces can always be represented in terms of concentrated loads through superposition. For the rotating part, two types of concentrated loads often appear in real applications. One is fixed in space and takes the form of $$f_R^{(1)} = f_{Rx}^{(1)}I + f_{Ry}^{(1)}J + f_{Rz}^{(1)}K \tag{85}$$

The other is rotating with the rotor and takes the form of $$F_R^{(2)} = f_{Rx}^{(2)}i + f_{Ry}^{(2)}j + f_{Rz}^{(2)}K \tag{86}$$

In addition, the concentrated force acts on point R with position vector $\tilde{r}_R$. Moreover, $\tilde{r}_R$ can be represented in terms of both inertia XYZ frames or rotating xyz frames as follows.

$$\tilde{r}_R \equiv x_R I + y_R J + z_R K \equiv \tilde{x}_R i + \tilde{y}_R j + \tilde{z}_R k \tag{87}$$

If the concentrated force is fixed in space as in (85), $(x_R, y_R, z_R)$ are constants and $(\tilde{x}_R, \tilde{y}_R, \tilde{z}_R)$ are functions of time. In contrast, if the concentrated force is rotating in space as in (86), $(x_R, y_R, z_R)$ are functions of time and $(\tilde{x}_R, \tilde{y}_R, \tilde{z}_R)$ are constants. According to (26), the virtual displacement of $\tilde{r}_R$ is $$\delta R_R^{(S)}(\tilde{r}_R, t) = \sum_{n=1}^{n_S} W_n^{(S)}(\tilde{r}_R)\delta q_n^{(S)}(t) \tag{88}$$

There are two issues worth noting in (88). First, the virtual displacement is written in terms of the rotating coordinates xyz because of the mode shapes $W_n^{(S)}(\tilde{r}_R)$. Second, the argument $\tilde{r}_R$ inside the mode shape is a function of time for space-fixed force $f_R^{(1)}(t)$, and is a constant for rotating force $f_R^{(2)}(t)$.

Based on (88), the virtual work done by space-fixed force $f_R^{(1)}(t)$ is $$\delta W_R^{(1)} = \delta q^T B_R^{(1)}(t) f_R^{(1)} \tag{89}$$

where $$B_R^{(1)}(t) = \begin{bmatrix} 0 & W_x^{(S)}(\tilde{r}_R(t)) \\ 0 & W_y^{(S)}(\tilde{r}_R(t)) \\ 0 & W_z^{(S)}(\tilde{r}_R(t)) \end{bmatrix}^T \begin{bmatrix} \cos\omega_3 t & \sin\omega_3 t & 0 \\ -\sin\omega_3 t & \cos\omega_3 t & 0 \\ 0 & 0 & 1 \end{bmatrix} \tag{90}$$

Similarly, the virtual work done by rotating force $f_R^{(2)}(t)$ is $$\delta W_R^{(2)} = \delta q^T B_R^{(2)} f_R^{(2)} \tag{91}$$

where $$B_R^{(2)} = \begin{bmatrix} 0 & W_x^{(S)} & (\tilde{r}_R) \\ 0 & W_y^{(S)} & (\tilde{r}_R) \\ 0 & W_z^{(S)} & 0(\tilde{r}_R) \end{bmatrix}^T \tag{92}$$

Note that $B_R^{(2)}$ is a constant matrix.

5.4 Generalized Damping Forces

For rotating machines, damping is very difficult to model accurately and effectively. If the damping model is too simple, predictions on forced response amplitude will be inaccurate. If the damping model is too complicated, it could become impractical to apply. As a compromise, the damping model used in this section assumes proportional damping and modal viscous damping factors. For the stationary part, assume that the damping force density (damping force per unit volume) is $$F_B(\hat{r}, t) = -2\rho_B \sum_{n=1}^{n_b} \zeta_n^{(B)} \omega_n^{(B)} W_n^{(B)}(\hat{r}) \dot{q}_n^{(B)}(t) \tag{93}$$

where $\rho_B$ is the density of the stationary part and $\xi_n^{(B)}$ is the viscous damping factor of each mode. In this case, the model allows some flexibility through $\xi_n^{(B)}$ while keeping the complexity of the model under control. The virtual work done by the damping force is $$\int_{V_b} (F_B \cdot \delta R_P)\, dV_b = -2 \sum_{n=1}^{n_b} \zeta_n^{(B)} \omega_n^{(B)} \dot{q}_n^{(B)}(t) \delta q_n^{(B)}(t) \tag{94}$$

where (10) and (12) have been used.

For the rotating part, there are two types of damping—internal damping and external damping. For asymmetric rotors, external damping is very difficult to model accurately and remains largely open. Therefore, we will focus on internal damping only. For internal damping, assume that $$F_S^{int}(\vec{r}, t) = -2\rho_S \sum_{n=1}^{n_S} \zeta_n^{int} \omega_n^{(S)} W_n^{(S)}(\vec{r}) \dot{q}_n^{(S)}(t) \tag{95}$$

where $\rho_S$ is the density of the rotating part, and $\xi_n^{int}$ is the internal viscous damping factor of each mode. The virtual work done by the internal damping force is $$\int_{V_S} (F_S^{int} \cdot \delta R_S)\, dV_S = -2 \sum_{n=1}^{n_S} \zeta_n^{int} \omega_n^{(S)} \dot{q}_n^{(S)}(t) \delta q_n^{(S)}(t) \tag{96}$$

where (23) and (26) have been used. Finally, the virtual work done by all the damping forces is arranged in a matrix form.

$$\delta W_d = -\delta q^T D \dot{q} \tag{97}$$

where $$D = 2 \times \mathrm{diag}[\xi_1^{(B)}\omega_1^{(B)}, \ldots, \xi_{n_b}^{(B)}\omega_{n_b}^{(B)}, \xi_1^{int}\omega_1^{(S)}, \ldots, \xi_{n_s}^{int}\omega_{n_s}^{(S)}] \tag{98}$$

6. Gyroscopic Equations of Motion

With the kinetic energy, potential energy, and generalized forces of the system, one can derive the gyroscopic equations of motion through use of Lagrangian equations. The resulting equation of motion is $$\ddot{q} + [G + C_B(t) + D]\dot{q} + [K + K_B(t)]q = B_R^{(1)}(t) f_R^{(1)} + B_R^{(2)} f_R^{(2)} + B_B^T f_B + f_c - H\dot{f}_s - G_B(t) f_s - H_B(t) f_s \tag{99}$$

where, $$G = \begin{bmatrix} 0 & 0 \\ 0 & G_{22}(n, m) \end{bmatrix} \tag{100}$$

with $G_{22}(n,m) = 2\omega_3 g_{nm}$ given in (32).

Also, $$K = \begin{bmatrix} \omega_B & 0 \\ 0 & \omega_S - \omega_3^2 K_\lambda(n, m) \end{bmatrix} \tag{101}$$

where $$\omega_B = \mathrm{diag}[\{\omega_1^{(B)}\}^2, \{\omega_2^{(B)}\}^2, \ldots, \{\omega_{n_b}^{(B)}\}^2] \tag{102}$$

$$\omega_S = \mathrm{diag}[\{\omega_1^{(S)}\}^2, \{\omega_2^{(S)}\}^2, \ldots, \{\omega_{n_s}^{(S)}\}^2] \tag{103}$$

and $K_\lambda(n,m) = \lambda_{nm}$ defined in (29).

Moreover, $$H = \begin{bmatrix} J_a^{(B)} & J_b^{(B)} \\ 0 & 0 \end{bmatrix} \tag{104}$$

where $$J_a^{(B)} = [J_{a1}^{(B)}, J_{a2}^{(B)}, \ldots, J_{an_b}^{(B)}]^T \tag{105}$$

and $$J_b^{(B)} = [J_{b1}^{(B)}, J_{b2}^{(B)}, \ldots, J_{bn_b}^{(B)}]^T \tag{106}$$

Finally, $f_c$ is defined as $$f_c = \omega_3^2 [0, J_{c1}^{(S)}, J_{c2}^{(S)}, \ldots, J_{cn_S}^{(S)}]^T \tag{107}$$

Note that the constant loading $f_c$ results from centrifugal forces due to rotor vibration. Nevertheless, $f_c$ does not affect vibration response of the rotor. Instead, it redefines the equilibrium position.

7. Special Case of Asymmetric, Flexible, Rotationally Periodic Rotors

The mathematical development shown above may be simplified for the special case of an asymmetric, flexible and rotationally periodic rotor. This simplified model may be appropriate, for example, for modeling jet engines wherein the rotating blades describe a rotationally periodic rotor. For an initial analysis, the effects of a flexible housing and bearings are not included. With these simplifying assumptions, a finite element analysis on the corresponding stationary rotor may be done to extract natural frequencies and mode shapes. The vibration of the spinning rotor may then be represented in terms of the mode shapes and their modal response in a coordinate system that is rotating with the spinning rotor. Through the use of Lagrange's equation, a modal equation of motion may be derived, using the finite element analysis to calculate the gyroscopic matrix, centrifugal stiffening matrix, and generalized modal excitation vector. Finally, the equation of motion may be solved numerically to obtain the modal response, which, in turn will lead to the physical response of the rotor for a rotor-based observer or for a ground-based observer through a coordinate transformation.

The derivation described above may be applied directly to this simplified special case. The resulting equation of motion is $$\ddot{q} + [G + D]\dot{q} + [\omega_S - \omega_3^2 K_\lambda] q = B_R^{(1)}(t) f_R^{(1)} + B_R^{(2)} f_R^{(2)} + f_c \tag{108}$$

In (108), the generalized coordinate vector q onlly includes $q_b$, because the stationary part is not considered. Moreover, $G(n,m) = 2\omega_3 g_{mn}$ given in (32). Also, $$\omega_S = \mathrm{diag}[\{\omega_1^{(S)}\}^2, \{\omega_2^{(S)}\}^2, \ldots, \{\omega_{n_S}^{(S)}\}^2] \tag{109}$$

and $K_{80}(n,m)=\lambda_{nm}$ defined in (29). Finally, $f_c$ is defined as $$f_c=\omega_3^2[J_{c1}^{(S)},J_{c2}^{(S)}, \ldots ,J_{cn_S}^{(S)}]^T \tag{110}$$

Note that the constant loading $f_c$ results from centrifugal forces due to rotor vibration. Nevertheless, $f_c$ does not affect vibration response of the rotor. Instead, it redefines the equilibrium position.

The equation of motion in (108) is valid for asymmetric rotors with arbitrary geometry and complexity. Theoretically, using (108) to find the response of a rotating asymmetric rotors consists of the following three steps. The first step is to conduct a finite element simulation on a stationary rotor with the same boundary conditions. In the finite element analysis, natural frequencies, mode shapes, and nodal mass are extracted to calculate the coefficient matrices. The second step is to calculate the modal response q(t) from (108). The third step is to reconstruct the temporal response through (26). Although the procedure may look straightforward, there are several critical issues that need to be explained further. They include gyroscopic coupling, modal analysis, axisymmetric rotors, and balanced and unbalanced modes.

7.1 Gyroscopic Coupling

Figure 6:
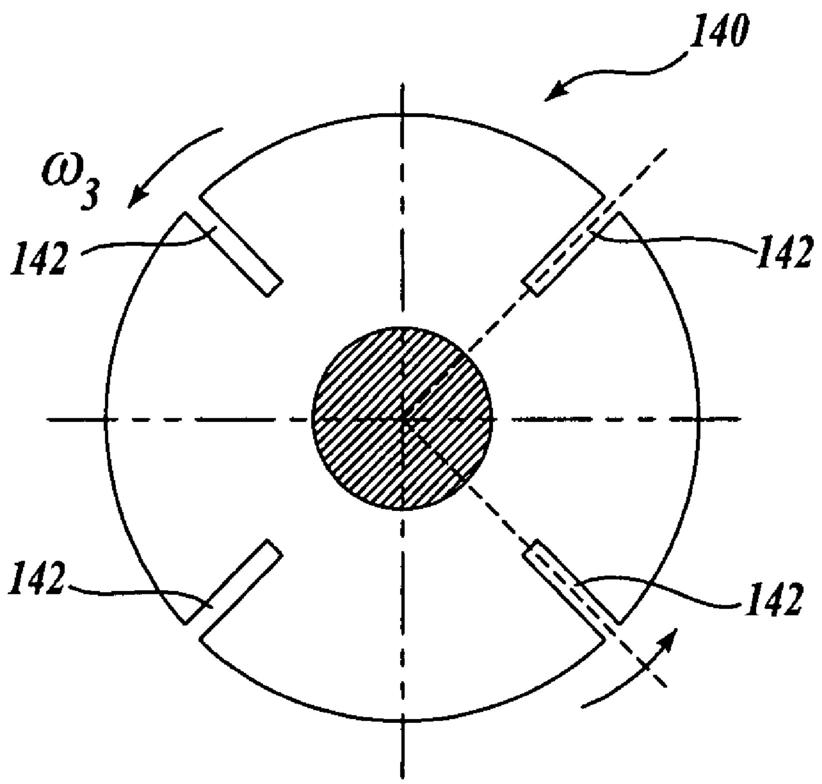
FIG. 6 shows a spinning circular disk with evenly-spaced radial slots.
Figure 7A:
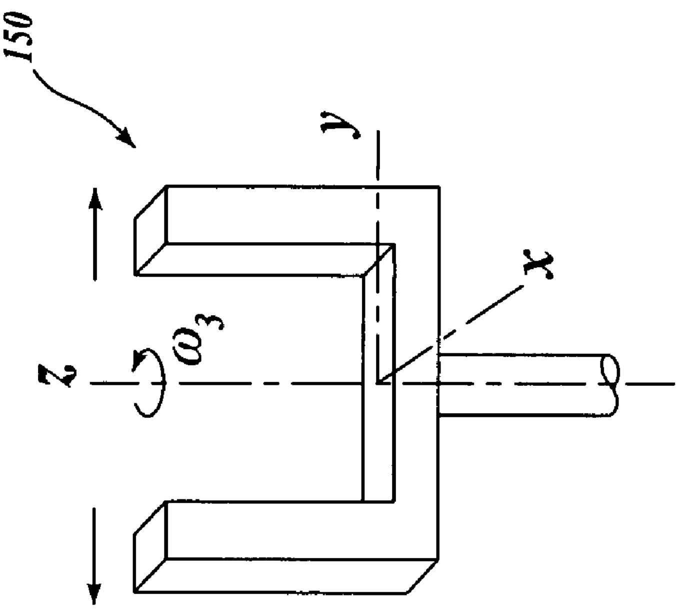
FIGS. 7A-7B show a spinning fork, indicating (a) redial vibration and (b) torsional vibration.
Figure 7B:
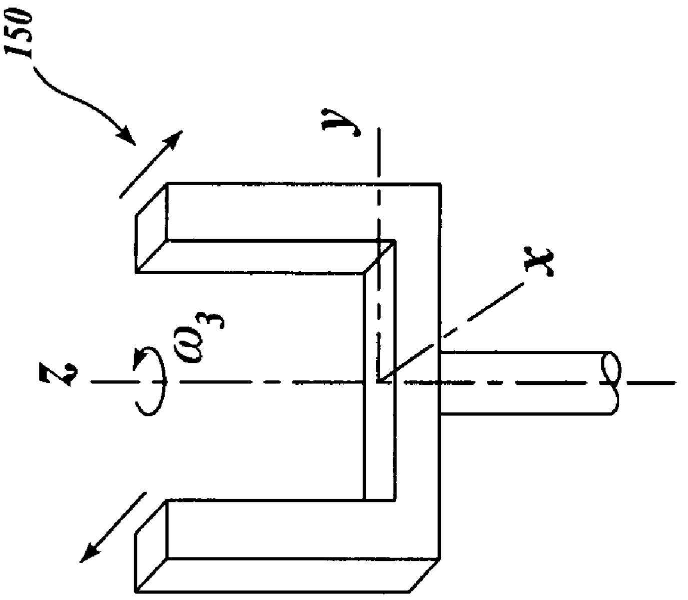

Vibration modes $q_m(t)$ and $q_n(t)$ are gyroscopically coupled, if $g_{nm}$ defined in (32) is not zero. According to (32), the gyroscopic coupling effect will disappear if the mode shapes $W_m^{(S)}(\tilde r)$, $W_n^{(S)}(\tilde r)$, and the z-axis are co-planar. For example, and referring now to FIG. 6, flexural vibration of a rotating disk 140 with evenly spaced radial slots 142 will not have gyroscopic coupling. This is because the mode shapes of the slotted disk 140 in flexural vibration are all in the z direction, causing $g_{nm}$ to vanish. In contrast, a spinning fork 150, as shown in FIG. 7, will have significant gyroscopic coupling between its radial bending mode, FIG. 7(*a*), and torsional mode, FIG. 7(*b*). This is because the bending mode shape, torsional mode shape, and the z-axis are orthogonal to one another.

7.2 Modal Analysis

The theory of modal analysis assumes that the system is time-invariant, i.e., the equation of motion has constant coefficients. Under this assumption, natural frequencies and mode shapes exist from which one can calculate frequency response functions ("FRF"). Conversely, if FRF can be measured experimentally, natural frequencies and mode shapes can be extracted from the measured FRF.

For spinning asymmetric rotors, the equation of motion only has constant coefficients in the rotating frame xyz. This implies that the theory of modal testing is only valid when both the input force and the output displacement are co-rotating with the rotor. For example, a strain gage on the spinning fork 150 in FIG. 7 can give output strain co-rotating with the fork 150. In practical applications, it is often more desirable to know the relationship between a ground-based input force and a ground-based vibration output. For example, vibration monitoring of rotating machines often avoids the use of a slip ring and adopts ground-based measurements.

To explain modal analysis of spinning asymmetric rotors with ground-based input and output, assume that a ground-based input force $f_R^{(1)}(t)$ fixed in the space is applied at $\tilde r_R$ given in (87). Moreover, the ground-based observer has an output location C with position vector $$\tilde r_C=x_C I+y_C J+z_C K=\tilde x_C i+\tilde y_C j+\tilde z_C k \tag{111}$$

Note that $(x_C,y_C,z_C)$ are constants and $(\tilde x_C, \tilde y_C, \tilde z_C)$ are functions of time because the output location is fixed in space. According to (26), the displacement of the output point C is $$u_C^{(S)}(\tilde r_C(t),t) = \sum_{n=1}^{n_S} W_n^{(S)}(\tilde r_C(t))q_n^{(S)}(t) = B_C^{(1)}(t)q(t) \tag{112}$$

where $u_C^{(S)}(\tilde r_C(t),t)$ is the displacement vector in the inertia XYZ frame and $$B_C^{(1)}(t) \equiv \begin{bmatrix} \cos\omega_3 t & -\sin\omega_3 t & 0 \\ \sin\omega_3 t & \cos\omega_3 t & 0 \\ 0 & 0 & 1 \end{bmatrix} \begin{bmatrix} W_{x1}^{(S)}(\tilde r_C(t)) & W_{x2}^{(S)}(\tilde r_C(t)) & \cdots & W_{xn_S}^{(S)}(\tilde r_C(t)) \\ W_{y1}^{(S)}(\tilde r_C(t)) & W_{y2}^{(S)}(\tilde r_C(t)) & \cdots & W_{yn_S}^{(S)}(\tilde r_C(t)) \\ W_{z1}^{(S)}(\tilde r_C(t)) & W_{z2}^{(S)}(\tilde r_C(t)) & \cdots & W_{zn_S}^{(S)}(\tilde r_C(t)) \end{bmatrix} \tag{113}$$

The modal analysis of spinning asymmetric rotors with ground-base input and output consists of three steps. The first step is time modulation through $B_R^{(1)}(t)$ in (90). Note that the mode shape $W_n^{(S)}(\tilde r)$ is periodic in its angular coordinate θ. Moreover, the fixed input location requires that $\theta=-\omega_3 t$. As a result, $B_R^{(1)}(t)$ in (90) is a periodic function with fundamental frequency $\omega_3$, i.e., $$B_R^{(1)}(t) \equiv \sum_{n=-\infty}^{\infty} b_n e^{jn\omega_3 t} \tag{114}$$

where $j\equiv\sqrt{-1}$ and $b_n$ are the Fourier coefficients depending only on the radial input location. Now consider the equation of motion (99). The Fourier transform of the modal input force is $$F\{B_R^{(1)}(t)f_R^{(1)}(t)\} = \sum_{n=-\infty}^{\infty} b_n \bar f_R^{(1)}(\omega - n\omega_3) \tag{115}$$

where $\bar f_R^{(1)}\omega\equiv F\{f_R^{(1)}(t)\}$ is the Fourier transform of $f_R^{(1)}(t)$. Note that the modulation in time domain through $B_R^{(1)}(t)$ turns into a series frequency shift of $\bar f_R^{(1)}(\omega)$. Because the modulation is not purely sinusoidal, the frequency shift contains not only the fundamental frequency $\omega_3$ but also its higher harmonics.

The second step is the traditional modal analysis of time-invariant systems. Assume that only the ground-based input force $f_R^{(1)}(t)$ is present. A Fourier transform of (108) and use of (115) result in $$\bar q(\omega) = [-\omega^2 I + j\omega(G+D) + (\omega_S - \omega_3^2 K_\lambda)]^{-1} \sum_{n=-\infty}^{\infty} b_n \bar f_R^{(1)}(\omega - n\omega_3) \tag{116}$$

The third step is to transform $\bar q(\omega)$ back to the ground base observer according to (112). In the time domain, the resulting displacement $u_C^{(S)}$ is very complicated because of the modulation through $B_C^{(1)}(t)$ in (112). The physics, however, can be explained better in the frequency domain as follows. Again, note that the mode shape $W_n^{(S)}(\tilde r)$ is periodic in its angular coordinate θ. Moreover, the fixed output location requires that $\theta=-\omega_3 t$. As a result, $B_C^{(1)}(t)$ in (113) is a periodic function with fundamental frequency $\omega_3$, i.e., $$B_C^{(1)}(t) \equiv \sum_{n=-\infty}^{\infty} c_n e^{jn\omega_3 t} \tag{117}$$

where $c_n$ are the Fourier coefficients, depending on the radial output location. Therefore, a Fourier transform of (112) results in $$\overline{u}_C^{(S)}(\omega) = \sum_{n=-\infty}^{\infty} c_n \overline{q}(\omega - n\omega_3) \tag{118}$$

Likewise, the modulation in time domain through $B_C^{(1)}(t)$ turns into a series frequency shift of $\overline{q}(\omega)$.

8. Application of Method to Design of Apparatus with Rotating Components

The vibrational analysis method described in detail above provides a method for analyzing the vibration of rotating machines with arbitrary geometry and complexity. The method provides several advantages over prior art methods, including (i) the method incorporates the gyroscopic effects that only appear in rotating machines; (ii) the method computationally couples the vibration of the rotor and the housing; (iii) the method can accommodate rotor and housing with arbitrary geometry; and, in particular, (iv) the method can be applied to asymmetric rotor geometry. It is contemplated that the method may be incorporated into existing finite element analysis software tools.

The method may be used to improve the design of apparatus having rapidly spinning components and to reduce the cost of such designs by providing an analytical framework for analyzing the vibrational response of the apparatus. The results of the vibrational analysis may be utilized by the designer to model many different physical designs and/or to modify existing designs, to improve the performance of the device, and without requiring, or at least reducing the amount of, prototyping and testing that must be done.

Figure 8:
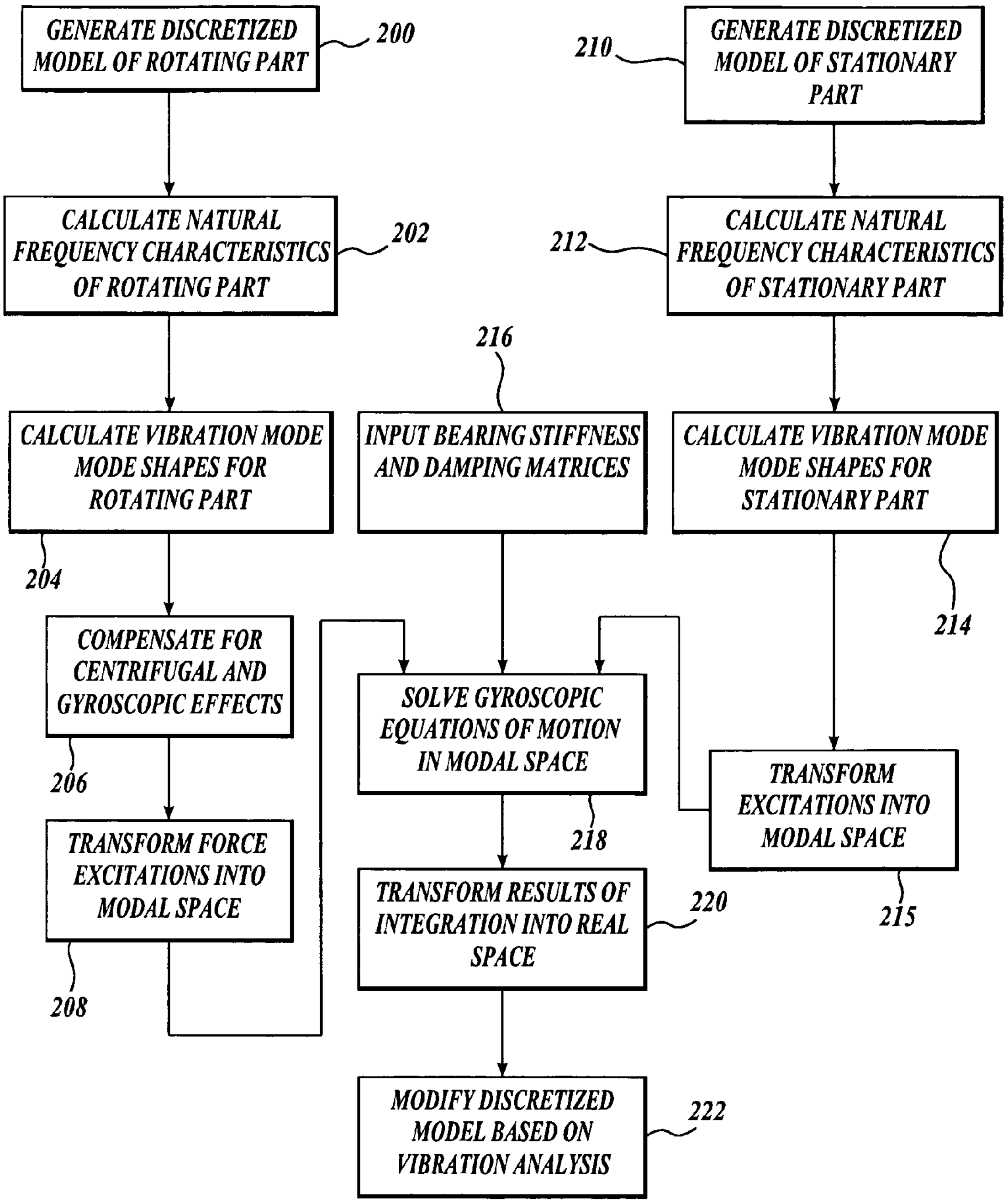
FIG. 8 is a flow chart illustrating a method of using the present algorithm in the design of a device having a rotating component.

FIG. 8 shows a flow chart of the steps that may be undertaken by a design engineer during the development and design of an apparatus having a rapidly rotating component, such as a hard disk drive, a jet engine, or the like. A discretized model of the rotating component of the apparatus is generated 200, for example a mesh model of the component that is suitable for finite element analysis. A similar discretized model of a stationary component of the apparatus may also be generated 210. Using the discretized models, the natural frequency characteristics of the rotating component are calculated 202, which for convenience may be based on the natural frequency for the stationary rotor, undamped, and with free boundary conditions. The natural frequency characteristics of the stationary component are also calculated 212. The vibration mode shapes of the rotating component 204, and the vibration mode shapes of the stationary component 214 are then calculated. The centrifugal and gyroscopic effects are then included into the model 206. For example the finite element analysis may be used to calculate the gyroscopic matrix, centrifugal stiffening matrix. The force excitations are transformed into modal space 208 for the rotating part. Similarly, the force excitations for the stationary part are transformed into modal space 215.

The designer enters estimated/calculated bearing stiffness and damping matrices 216. The designer will also typically enter force and excitation parameters. The gyroscopic equations of motion are then solved 218 in modal space, based on the calculated vibration modes. The results of the modal space solution may then be transformed into real space 220 (i.e. physical three-dimensional) using a coordinate transformation, to provide the vibrational response of the initial design of the apparatus. The designer can then utilize this data to modify the design of the apparatus 222, to improve its vibrational characteristics. It will be apparent that the design engineer may modify the design specifically to achieve a desired outcome, for example by selectively changing the thickness, shape or stiffness of the components according to standard engineering principles, and iteratively modify the design. The designer may thereby analyze a large number of designs and select the design providing the desired characteristics.

Although the method has been illustrated for analyzing a single rotor arrangement, it will be apparent that the method can be extended in a straightforward manner to apparatus having multiple rotors, arranged in series, parallel or a network of series and parallel. Rotating machines with multiple rotors are common, including for example, turbine engines and mass data storage systems.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for improving the vibrational characteristics of a device having a rotating element, the method comprising:

(a) in a computer, generating a finite element model of a rotating element of a first version of a device while the rotating element is stationary, the rotating element having arbitrary geometry;

(b) selecting and calculating from said finite element model a set of independent vibration shape functions, each of the independent vibration shape functions being defined over the entire geometry for the rotating element while the rotating element is stationary;

(c) calculating the stationary natural frequencies of the rotating element corresponding to the independent vibration shape functions using the finite element model;

(d) calculating gyroscopic and stiffness coefficients of the rotating element from the independent vibration shape functions while the rotating element is rotating at a specified rotational speed;

(e) solving gyroscopic equations of motion that include the gyroscopic and stiffness coefficients in terms of generalized coordinates to obtain vibrational characteristics of the rotating element corresponding to the independent vibration shape functions;

(f) transforming the obtained vibrational characteristics from generalized coordinates into three-dimensional physical space; and (g) modifying the first version of the device using the transformed vibrational characteristics.

2. The method of claim 1, wherein the independent vibration shape functions are stationary vibration mode shapes of the rotating element.

3. The method of claim 1, wherein at least some of the natural frequencies and said independent vibration shape functions are determined using a finite element analysis applied to the finite element model wherein the rotating element is stationary, undamped, and subject to free boundary conditions.

4. The method of claim 1, wherein the set of equations of motion includes externally applied generalized forces, damping forces, and centrifugal stiffening effects from the rotating element.

5. The method of claim 1, wherein the coefficient of the set of equation of motion are derived from the natural frequencies and the gyroscopic coefficients.

6. The method of claims 4 wherein the damping forces are modeled in the form of modal viscous damping factors.

7. The method of claim 1, wherein the equations of motion comprise constant coefficients.

8. A method for improving the vibrational characteristics of a device having a rotating element, a non-rotating element, and at least one bearing disposed between the rotating element and the non-rotating element, the method comprising the steps of:

(a) in a computer, generating a first finite element model of a rotating element of a first version of a device while the rotating element is stationary, the rotating element having an arbitrary geometry;

(b) selecting from the first finite element model a first set of independent vibration shape functions, each of the independent vibration shape functions being defined over the entire geometry of the rotating element while the rotating element is stationary;

(c) calculating the stationary natural frequencies of the rotating element corresponding to the first set of independent vibration shape functions using the first finite element model;

(d) calculating a first set of gyroscopic and stiffness coefficients of the rotating element from the first set of independent vibration shape functions while the rotating element is rotating at a specified rotational speed;

(e) in a computer, generating a second finite element model of a non-rotating element of the first version of the device, the non-rotating element having an arbitrary geometry;

(f) selecting from the second finite element model a second set of independent vibration shape functions defined over the entire geometry of the non-rotating element;

(g) calculating natural frequencies of the non-rotating element corresponding to the second set of independent vibration shape functions using the second finite element model;

(h) calculating a second set of stiffness coefficients of the non-rotating element from the second set of independent vibration shape functions;

(i) solving a set of equations of motion comprising the first set of gyroscopic and stiffness coefficients and the second set of stiffness coefficients in terms of generalized coordinates to obtain some of the vibrational characteristics of the rotating element corresponding to the first and second sets of independent vibration shape functions;

(j) transforming the obtained vibrational characteristics from generalized coordinates into three-dimensional physical space; and (k) modifying the first version of the device using the transformed vibrational characteristics to generate a second version of the device.

9. The method of claim 8, wherein the first set of independent vibration shape functions are stationary vibration mode shapes of the rotating element.

10. The method of claim 8, wherein the step of selecting the first set of independent vibration shape functions for the rotating element comprises selecting a first set of independent vibration shape functions for the rotor when the rotor is stationary, undamped, and subject to free boundary conditions.

11. The method of claim 8, wherein the second set of independent vibration shape functions is vibration mode shapes of the non-rotating element.

12. The method of claim 8, wherein the second set of independent vibration shape functions is a portion of vibration mode shapes, defined over the non-rotating element of the device while the rotating element of the device is stationary.

13. The method of claim 8, wherein the non-rotating element is rigid.

14. The method of claim 8, wherein at least some of the natural frequencies and said independent vibration shape functions of the rotating element are determined using a finite element analysis applied to the model of the rotating element, wherein the rotating element is stationary, undamped, and subject to free boundary conditions.

15. The method of claim 8, wherein the set of equations of motion includes externally applied generalized forces, damping forces, and centrifugal stiffening effects from the rotating element.

16. The method of claim 8, wherein the set of equations of motion includes externally applied generalized forces, damping forces, and externally prescribed motion of the non-rotating element.

17. The method of claim 8, wherein the set of equation of motion includes generalized forces from the at least one bearing.

18. The method of claim 8, wherein the coefficient of the set of equation of motion are calculated from the natural frequencies of the rotating element and the non-rotating element and from the gyroscopic coefficients of the rotating element.

19. The method of claims 15, wherein the damping forces of the rotating element and the non-rotating element are modeled as modal viscous damping factors.

20. The method of claim 8, wherein the equations of motion comprise constant coefficients.

21. The method of claim 8, wherein the bearing model is a linear combinations of spring forces and damping forces.

22. The method of claim 21, wherein the spring forces and damping forces are nonlinear.

23. The method of claim 8, wherein the rotating element and the non-rotating element are modeled as linearly elastic elements.

* * * * *

UNITED STATES PATENT AND TRADEMARK OFFICE

CERTIFICATE OF CORRECTION

PATENT NO. : 7,630,869 B2
APPLICATION NO. : 10/854608
DATED : December 8, 2009
INVENTOR(S) : I. Y. Shen et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1166 days.

| **COLUMN** | **LINE** | |
|---|---|---|
| 1 | 17-20 | "The present invention was made in the course of research that was supported by the National Science Foundation under grants CMS-0244116 and CMS-9820745. The United States Government may have certain rights to the invention herein." should read --This invention was made with government support under grant numbers CMS-9820745 and CMS-0244116 awarded by the National Science Foundation. The government has certain rights in the invention.-- |
| 21 (Claim 5, | 9 line 2) | "equation of motion" should read --equations of motion-- |
| 21 (Claim 6, | 11 line 1) | "claims 4" should read --claim 4-- |
| 22 (Claim 17, | 39 line 1) | "equation of motion" should read --equations of motion-- |
| 22 (Claim 18, | 43 line 2) | "equation of motion" should read --equations of motion-- |
| 22 (Claim 19, | 47 line 1) | "claims 15" should read --claim 15-- |

Signed and Sealed this

Twenty-seventh Day of July, 2010

David J. Kappos

David J. Kappos
*Director of the United States Patent and Trademark Office*

| COLUMN | LINE | |
|---|---|---|
| 22 (Claim 21, line 2) | 53 | "combinations of" should read --combination of-- |